US012544929B2

United States Patent
(12) United States Patent
Rodrigues

(10) Patent No.: US 12,544,929 B2
(45) Date of Patent: Feb. 10, 2026

(54) ROBOTIC SYSTEM WITH DEPTH-BASED PROCESSING MECHANISM AND METHODS FOR OPERATING THE SAME

(71) Applicant: MUJIN, Inc., Tokyo (JP)

(72) Inventor: Jose Jeronimo Moreira Rodrigues, Tokyo (JP)

(73) Assignee: MUJIN, Inc., Tokyo (JP)

( * ) Notice: Subject to any disclaimer, the term of this patent is extended or adjusted under 35 U.S.C. 154(b) by 705 days.

(21) Appl. No.: 17/732,302

(22) Filed: Apr. 28, 2022

(65) Prior Publication Data

US 2023/0027984 A1 Jan. 26, 2023

Related U.S. Application Data

(60) Provisional application No. 63/224,292, filed on Jul. 21, 2021.

(51) Int. Cl.
*G06F 7/00* (2006.01)
*B25J 9/16* (2006.01)
*B25J 13/08* (2006.01)
*B65G 61/00* (2006.01)

(52) U.S. Cl.
CPC ........... *B25J 9/1687* (2013.01); *B25J 9/1697* (2013.01); *B25J 13/089* (2013.01); *B65G 61/00* (2013.01)

(58) Field of Classification Search
CPC ...... B25J 9/1687; B25J 9/1697; B25J 13/089; B25J 9/1656; B25J 9/1664–1666; B25J 9/1676–1684; B25J 13/087; B65G 61/00; B65G 2203/0208; B65G 2203/041; B65G 1/1373–1375; B65G 1/20; B65G 2203/02–0241; B65G 2203/0266; B65G 2203/0283; B65G 2203/04–042; B65G 2203/044; B65G 57/00; B65G 59/00; B65G 60/00; B65G 9/1687; B65G 2201/0267; B65G 9/004; B65G 57/02–03; B65G 57/04; B65G 57/22; B65G 57/24; B65G 59/02; B65G 59/04; G05B 2219/39102; G05B 2219/40006; G05B 2219/40607; G05B 2219/39104–39105; G05B 2219/39113; G05B 2219/39117; G05B 2219/40424–40425
USPC .................................................. 700/213, 217
See application file for complete search history.

(56) References Cited

U.S. PATENT DOCUMENTS 4,907,169 A 3/1990 Lovoi
5,812,395 A 9/1998 Mascianegelo et al.
6,272,230 B1 8/2001 Hiraoglu
6,290,454 B1 9/2001 Huang et al.
(Continued)

FOREIGN PATENT DOCUMENTS

CN 1293752 A 5/2001
CN 1135201 C 1/2004
(Continued)

OTHER PUBLICATIONS

USPTO Final Office Action mailed Apr. 18, 2019 for U.S. Appl. No. 16/290,741, filed Mar. 1, 2019, 16 pages.
(Continued)

*Primary Examiner* — Yolanda R Cumbess
(74) *Attorney, Agent, or Firm* — Dorsey & Whitney LLP

(57) ABSTRACT

A system and method for estimating aspects of target objects and/or associated task implementations is disclosed.

19 Claims, 7 Drawing Sheets

(56) References Cited

U.S. PATENT DOCUMENTS 7,085,622 B2 8/2006 Sadighi et al.
7,646,917 B2 1/2010 Jung et al.
7,724,448 B2 5/2010 Watanabe
8,442,297 B2 5/2013 Tyler et al.
8,517,928 B2 8/2013 Orihara
9,050,719 B2 6/2015 Valpola et al.
9,067,744 B2 6/2015 Takizawa et al.
9,102,055 B1 8/2015 Konolige et al.
9,227,323 B1 1/2016 Konolige et al.
9,233,470 B1 1/2016 Bradski et al.
9,272,417 B2 3/2016 Konolige et al.
9,314,924 B1 4/2016 Laurent et al.
9,327,406 B1 5/2016 Hinterstoisser
9,486,921 B1 11/2016 Straszheim et al.
9,630,320 B1 4/2017 Konolige et al.
9,630,321 B2 4/2017 Bradski et al.
9,757,858 B2 9/2017 Eto et al.
9,796,540 B1 10/2017 Shellenbaum et al.
9,862,093 B2 1/2018 Bradski et al.
9,875,427 B2 1/2018 Medasani et al.
10,124,489 B2 11/2018 Chitta et al.
10,147,398 B2 12/2018 Koga
10,328,578 B2 6/2019 Holz
10,369,701 B1 8/2019 Diankov et al.
10,471,597 B1 11/2019 Murphy et al.
10,518,410 B2 12/2019 Bradski et al.
10,562,188 B1 2/2020 Diankov et al.
10,562,189 B1 2/2020 Diankov et al.
10,614,340 B1 4/2020 Yu et al.
10,625,952 B1 4/2020 Luthra et al.
10,703,584 B2 7/2020 Diankov et al.
11,034,025 B2 6/2021 Diankov et al.
11,062,457 B2 7/2021 Diankov et al.
11,068,679 B2 7/2021 Rodriguez et al.
11,176,674 B2 11/2021 Diankov et al.
11,189,033 B2 11/2021 Diankov et al.
11,288,810 B2 3/2022 Diankov et al.
11,436,748 B2 9/2022 Liu
11,482,045 B1 10/2022 Kim et al.
11,501,445 B2 11/2022 Diankov et al.
11,541,545 B2 1/2023 Yamada et al.
11,636,605 B2 4/2023 Yu et al.
11,780,101 B2 10/2023 Diankov et al.
11,797,926 B2 10/2023 Diankov et al.
11,961,042 B2 4/2024 Yu et al.
12,002,007 B2 6/2024 Diankov et al.
2002/0106273 A1 8/2002 Huang et al.
2005/0101524 A1 5/2005 Hogg
2007/0177011 A1 8/2007 Lewin et al.
2007/0177790 A1 8/2007 Ban et al.
2009/0028686 A1 1/2009 Tallis et al.
2009/0138121 A1 5/2009 Wicks et al.
2010/0004778 A1 1/2010 Arimatsu et al.
2010/0082152 A1 4/2010 Mishra et al.
2010/0222915 A1 9/2010 Kuehnemann et al.
2011/0216185 A1 9/2011 Laws et al.
2011/0218670 A1 9/2011 Bell et al.
2013/0096713 A1 4/2013 Takizawa et al.
2013/0211593 A1 8/2013 Domae et al.
2014/0052555 A1 2/2014 MacIntosh
2015/0066199 A1 3/2015 Shimono
2015/0203304 A1 7/2015 Morency et al.
2015/0262012 A1 9/2015 Kim et al.
2016/0016311 A1 1/2016 Konolige et al.
2016/0089791 A1 3/2016 Bradski et al.
2016/0136808 A1 5/2016 Konolige et al.
2017/0003113 A1 1/2017 Pettersson
2017/0057146 A1 3/2017 Altonen et al.
2017/0057148 A1 3/2017 Altonen et al.
2017/0076469 A1 3/2017 Sonoura et al.
2017/0137236 A1 5/2017 Sonoura et al.
2017/0177746 A1 6/2017 Gotou
2017/0246744 A1* 8/2017 Chitta .................... B25J 9/1687
2018/0126553 A1 5/2018 Corkum et al.
2018/0198983 A1 7/2018 Fukuya et al.
2018/0243904 A1 8/2018 Bradski
2018/0253516 A1 9/2018 Shimano et al.
2018/0304468 A1 10/2018 Holz
2019/0206059 A1 7/2019 Landman
2020/0078938 A1 3/2020 Bradski et al.
2020/0122344 A1 4/2020 Lee et al.
2020/0130962 A1 4/2020 Yu et al.
2020/0130963 A1 4/2020 Diankov et al.
2020/0134828 A1 4/2020 Diankov et al.
2020/0134830 A1 4/2020 Yu et al.
2020/0139553 A1 5/2020 Diankov et al.
2020/0279084 A1 9/2020 Davis et al.
2020/0294244 A1 9/2020 Diankov et al.
2020/0302207 A1 9/2020 Perkins et al.
2020/0334835 A1 10/2020 Buibas et al.
2020/0377315 A1 12/2020 Diankov
2021/0129334 A1 5/2021 Kanunikov
2021/0158609 A1 5/2021 Raskob et al.
2021/0260771 A1 8/2021 Diankov et al.
2021/0304416 A1 9/2021 Yu et al.
2021/0383550 A1* 12/2021 Yu .......................... B25J 9/1697
2022/0051411 A1 2/2022 Diankov et al.
2022/0076425 A1 3/2022 Yu et al.
2022/0157063 A1* 5/2022 Bronicki ............... G06T 7/0004
2022/0203547 A1 6/2022 Majumdar
2022/0261738 A1* 8/2022 Kumar ................. G06Q 10/083
2022/0292278 A1 9/2022 Roberts et al.
2022/0305680 A1 9/2022 Turpin
2023/0008540 A1 1/2023 Diankov et al.
2023/0027984 A1 1/2023 Rodrigues
2023/0041343 A1 2/2023 Yu et al.
2023/0150777 A1 5/2023 Skyum et al.
2023/0415360 A1 12/2023 Diankov et al.
2024/0020637 A1 1/2024 Yu et al.
2024/0078512 A1 3/2024 Diankov et al.

FOREIGN PATENT DOCUMENTS

CN 1791475 A 6/2006
CN 102616578 A 8/2012
CN 202539084 U 11/2012
CN 103568024 A 2/2014
CN 103817699 A 5/2014
CN 103822594 A 5/2014
CN 104608150 A 5/2015
CN 103043359 A 7/2015
CN 104903677 A 9/2015
CN 105817430 A 8/2016
CN 106063998 A 11/2016
CN 106660207 A 5/2017
CN 106886165 6/2017
CN 106945035 A 7/2017
CN 107889452 A 4/2018
CN 108349083 A 7/2018
CN 110253629 A 9/2019
CN 111566028 A 8/2020
CN 111629868 A 9/2020
CN 112109082 A 12/2020
DE 102014016069 A1 5/2015
DE 102015106936 A2 11/2015
JP 02269587 A 11/1990
JP 03234491 A 10/1991
JP H03234491 A 10/1991
JP H06171760 A 6/1994
JP 07053054 A 2/1995
JP 2007097057 A 4/1995
JP H0797057 A 4/1995
JP 07299782 A 11/1995
JP H07291450 A 11/1995
JP 10031742 A 2/1998
JP 2894449 B2 5/1999
JP 11157609 A 6/1999
JP 11333770 A 12/1999
JP 2001058723 A 3/2001
JP 2001072247 A 3/2001
JP 2002013913 A 1/2002
JP 3277739 A 4/2002
JP 2003237943 A 8/2003
JP 2004050390 A 2/2004

(56) References Cited

FOREIGN PATENT DOCUMENTS

| | | | | |
|---|---|---|---|---|
| JP | 3596434 B2 | 12/2004 | | |
| JP | 2005333824 A | 12/2005 | | |
| JP | 3849514 B2 | 11/2006 | | |
| JP | 2006300929 A | 11/2006 | | |
| JP | 2007254128 A | 10/2007 | | |
| JP | 2008284690 A | 11/2008 | | |
| JP | 2010247959 A | 11/2010 | | |
| JP | 2013129034 A | 7/2013 | | |
| JP | 2013145525 A | 7/2013 | | |
| JP | 2013246589 A | 12/2013 | | |
| JP | 5429614 B2 | 2/2014 | | |
| JP | 2017058130 A | 3/2017 | | |
| JP | 2017097847 A | 6/2017 | | |
| JP | 2017520418 A | 7/2017 | | |
| JP | 2017149569 A | 8/2017 | | |
| JP | 2018047544 A | 3/2018 | | |
| JP | 2018097889 A | 6/2018 | | |
| JP | 6374993 B2 | 8/2018 | | |
| JP | 2018131237 A | 8/2018 | | |
| JP | 2018158439 A | 10/2018 | | |
| JP | 6461712 B2 | 1/2019 | | |
| JP | 2019005871 A | 1/2019 | | |
| JP | 6486114 B2 | 3/2019 | | |
| JP | 2019509559 A | 4/2019 | | |
| JP | 2019136828 A | 8/2019 | | |
| JP | 2020069636 A | 5/2020 | | |
| JP | 2020196117 A | 12/2020 | | |
| JP | 2021022364 A | 2/2021 | | |
| JP | 2021507857 A | 2/2021 | | |
| JP | 2021030386 A | 3/2021 | | |
| JP | 7175487 B1 | * 11/2022 | ............ | B25J 13/089 |
| WO | 2017146895 A1 | 8/2017 | | |
| WO | 2018131237 A1 | 7/2018 | | |
| WO | 2018185861 A1 | 10/2018 | | |

OTHER PUBLICATIONS

USPTO Notice of Allowance mailed Jun. 7, 2019 for U.S. Appl. No. 16/290,741, filed Mar. 1, 2019, 8 pages.

USPTO Non-Final Office Action mailed Jul. 12, 2019 for U.S. Appl. No. 16/443,743, filed Jun. 17, 2019, 11 pages.

USPTO Notice of Allowance mailed Oct. 9, 2019 for U.S. Appl. No. 16/443,743, filed Jun. 17, 2019, 12 pages.

USPTO Non-Final Office Action mailed Jul. 15, 2019 for U.S. Appl. No. 16/443,757, filed Jun. 17, 2019, 12 pages.

USPTO Notice of Allowance mailed Oct. 7, 2019 for U.S. Appl. No. 16/443,757, filed Jun. 17, 2019, 12 pages.

USPTO Non-Final Office Action mailed Nov. 14, 2019 for U.S. Appl. No. 16/539,790, filed Aug. 13, 2019, 16 pages.

Korean Intellectual Property Office, International Application Division, International Search Report and Written Opinion for PCT/US2019/035608 filed Jun. 5, 2018, mailed Aug. 29, 2019, 9 pages.

Japanese Patent Office, Notice of Reasons for Rejection for Japanese Application No. 2019-133517, mailed Nov. 18, 2019, with English translation, 6 pages.

International Search Report and Written Opinion mailed Feb. 17, 2020 for PCT/US2019/058650 filed Oct. 29, 2019, ISA/KR, 12 pages.

USPTO Notice of Allowance mailed Mar. 9, 2020 for U.S. Appl. No. 16/539,790, filed Aug. 13, 2019, 19 pages.

Jia, Tong et al., "Depth Measurement Based on Infrared Coded Structured Light," Hindawi Publishing Corporation, Journal of Sensors, vol. 2014, Article ID 852261, 8 pages, published Oct. 19, 2014.

Japanese Patent Office, Decision to Grant Japanese Application No. 2019-133517, mailed Mar. 17, 2020, 3 pages.

Japanese Patent Office, Notice of Reasons for Rejection for Japanese Application No. 2020- 514759, mailed Oct. 28, 2020, with English translation, 6 pages.

Japanese Patent Office, Notice of Reasons for Rejection for Japanese Application No. 2020-515142, mailed Nov. 9, 2020, with English translation, 13 pages.

Japanese Patent Office, Decision to Grant Japanese Application No. 2020-514759, mailed Nov. 27, 2020, 3 pages.

Japanese Patent Office, Notice of Reasons for Rejection for Japanese Application No. 2020-514750, mailed Oct. 28, 2020, with English translation, 7 pages.

CNIPA Office Action mailed Jul. 2, 2020 for Application No. 201910597137.2, 5 pages.

CNIPA Office Action mailed Jan. 7, 2021 for Application No. 201910597137.2, 3 pages.

Japanese Patent Office, Decision to Grant Japanese Application No. 2020-515142, mailed Dec. 7, 2020, 3 pages.

USPTO Notice of Allowance mailed Feb. 10, 2021 for U.S. Appl. No. 16/736,667, filed Jan. 7, 2020, First Inventor: Rosen Diankov, 23 pages.

CNIPA Office Action mailed Mar. 3, 2021 for Application No. 202010482376.6, 11 pages.

German Patent Office Office Action mailed Nov. 18, 2020 for Application No. 112019000125.6, 7 pages.

German Patent Office Decision to Grant mailed Mar. 16, 2021 for Application No. 112019000125.6, 6 pages.

Holz et al., Fast Edge-Based Detection and Localization of Transport Boxes and Pallets in RGB-D Images for Mobile Robot Bin Picking, ISR 2016, Jun. 21-22, 2016, Munich, Germany, pp. 133-140, Year: 2016.

Holz et al., "Real-Time Object Detection, Localization and Verification of Fast Robotic Depalletizing," 978-1-4799-9994-1, IEEE 2015, pp. 1459-1466, Year: 2015.

Doliotis et al., "A 3D Perception-based Robotic Manipulation System for Automated Truck Unloading," 978-1-5090-2409-4, IEEE 2016, pp. 262-267, Year: 2016.

International Bureau of WIPO, PCT International Preliminary Report on Patentability for PCT/US2019/035608 filed Jun. 5, 2019, mailed May 14, 2021, 6 pages.

International Bureau of WIPO, PCT International Preliminary Report on Patentability for PCT/US2019/058650 filed Oct. 29, 2019, mailed May 14, 2021, 9 pages.

CNIPA Notice to Grant mailed May 21, 2021 for Application No. 202010482376.6, 4 pages.

USPTO Non-Final Office Action mailed Jul. 21, 2021 for U.S. Appl. No. 16/888,376, filed May 29, 2020, 40 pages.

USPTO Notice of Allowance mailed Nov. 5, 2021 for U.S. Appl. No. 16/888,376, filed May 29, 2020, 13 pages.

German Patent Office Office Action mailed Mar. 16, 2022 for Application No. 112019000217.1, 8 pages.

CIPO Notice to Grant mailed Apr. 7, 2021 for Application No. 201910597137.2, 4 pages.

CIPO Office Action mailed Apr. 2, 2021 for Application No. 202010482364.3, 9 pages.

CIPO Office Action mailed Apr. 28, 2021 for Application No. 202010539908.5, 12 pages.

CIPO Office Action mailed Mar. 19, 2021 for Application No. 202010539927.8, 7 pages.

CIPO Notice to Grant mailed Apr. 13, 2021 for Application No. 202010416747.0, 4 pages.

CNIPA Notice to Grant mailed May 20, 2021 for Application No. 202010539927.8, 4 pages.

USPTO Non-Final Office Action mailed Dec. 12, 2022 for U.S. Appl. No. 17/313,921, filed May 6, 2021, First Named Inventor: Rosen Diankov, 20 pages.

Japanese Patent Office, Notice of Reasons for Rejection mailed Jul. 22, 2022 for Application No. 2022-097954, Applicant: Mujin, Inc., 14 pages.

Japanese Patent Office, Notice of Reasons for Rejection mailed Aug. 25, 2022 for Application No. 2022-097954, Applicant: Mujin, Inc., 8 pages.

Japanese Patent Office, Decision to Grant Japanese Application No. 2022-097954, mailed Oct. 4, 2022, 3 pages.

USPTO Notice of Allowance mailed May 30, 2023 for U.S. Appl. No. 17/313,921, filed May 6, 2021, First Named Inventor: Rosen Diankov, 26 pages.

Japanese Patent Office, Notice of Reasons for Rejection for Japanese Application No. 2020-072681, mailed Jun. 26, 2023, with English translation, 6 pages.

(56) References Cited

OTHER PUBLICATIONS

Japanese Patent Office, Decision to Grant Japanese Application No. 2020-516651, mailed Dec. 2, 2020, 3 pages.
CNIPA Office Action mailed Feb. 23, 2021 for Application No. 202010416747.0, 6 pages.
KIPO Notice of Reasons for Rejection mailed Jun. 30, 2023 for Application No. 9-5-2023-059249101, 3 pages.
KIPO Notice of Reasons for Rejection mailed Jun. 30, 2023 for Application No. 9-5-2023-059249246, 4 pages.
Japanese Patent Office, Office Action for Japanese Application No. 2020-216162, mailed Aug. 5, 2023, 5 pages.
Japanese Patent Office, Decision to Grant Japanese Application No. 2020-072681, mailed Oct. 19, 2023, 3 pages.
Japanese Patent Office, Decision to Grant Japanese Application No. 2020-501166, mailed Nov. 12, 2020, 3 pages.
KIPO Notice of Allowance mailed Dec. 29, 2023 for Application No. 10-2021-7016615, 4 pages.
Hashimoto, Manabu et al., "Vision System for Object Handling Robot Using a Low-Resolution Range Image and an Intensity Image," Transactions of the Institute of Electronics, Information and Communication Engineers, Japan, Jun. 1, 2001, vol. J84-DII, No. 6, pp. 985-993.
KIPO Notice of Allowance mailed Dec. 19, 2023 for Application No. 10-2021-7016611, 3 pages.
Japanese Patent Office, Decision to Grant Japanese Application No. 2020-216162, mailed Jan. 31, 2024 3 pages.
Japanese Patent Office, Office Action for Japanese Application No. 2023-133633, dated Apr. 18, 2024, 5 pages.
KIPO Notice of Reasons for Rejection mailed Jun. 28, 2024 for Korean patent application No. 10-2024-7009032.
Japanese Patent Office, Office Action for Japanese Application No. 2020-213054, mailed May 17, 2024, 2 pages.
Japanese Patent Office, Decision to Grant for Japanese Application No. 2022-095385, dated Jul. 14, 2022, 3 pages.
CNIPA Notice to Grant mailed Apr. 1, 2025 for Application No. 202210899251.2, 4 pages.

* cited by examiner

ROBOTIC SYSTEM WITH DEPTH-BASED PROCESSING MECHANISM AND METHODS FOR OPERATING THE SAME

RELATED APPLICATIONS

This application claims the benefit of U.S. Provisional Patent Application Ser. No. 63/224,292, filed Jul. 21, 2021, which is incorporated herein by reference in its entirety.

This application contains subject matter related to U.S. patent application Ser. No. 16/290,741, filed Mar. 1, 2019, now U.S. Pat. No. 10,369,701; U.S. patent application Ser. No. 16/443,743, filed Jun. 17, 2019, now U.S. Pat. No. 10,562,188; U.S. patent application Ser. No. 16/443,757, filed Jun. 17, 2019, now U.S. Pat. No. 10,562,189; U.S. patent application Ser. No. 16/736,667, filed Jan. 7, 2020, now U.S. Pat. No. 11,034,025; U.S. patent application Ser. No. 17/313,921, filed May 6, 2021; U.S. patent application Ser. No. 16/539,790, filed Aug. 13, 2019, now U.S. Pat. No. 10,703,584; and U.S. patent application Ser. No. 16/888,376, filed May 29, 2020. The subject matter of all these applications is incorporated herein by reference.

This application also contains subject matter related to U.S. patent application Ser. No. 17/732,271 titled "ROBOTIC SYSTEM WITH IMAGE-BASED SIZING MECHANISM AND METHODS FOR OPERATING THE SAME," filed concurrently herein, the subject matter of which is incorporated herein by reference.

TECHNICAL FIELD

The present technology is directed generally to robotic systems and, more specifically, robotic systems with depth-based processing mechanisms.

BACKGROUND

Robots (e.g., machines configured to automatically/autonomously execute physical actions) are now extensively used in many fields. Robots, for example, can be used to execute various tasks (e.g., manipulate or transfer an object) in manufacturing, packaging, transport and/or shipping, etc. In executing the tasks, robots can replicate human actions, thereby replacing or reducing human involvements that are otherwise required to perform dangerous or repetitive tasks. Robots often lack the sophistication necessary to duplicate the human sensitivity, flexibility, and/or adaptability required for analyzing and executing more complex tasks. For example, robots often have difficulty extrapolating multiple conclusions and/or generalizations based on limited information. Accordingly, there remains a need for improved robotic systems and techniques for extrapolating conclusions and/or generalizations.

DETAILED DESCRIPTION

Figure 1:
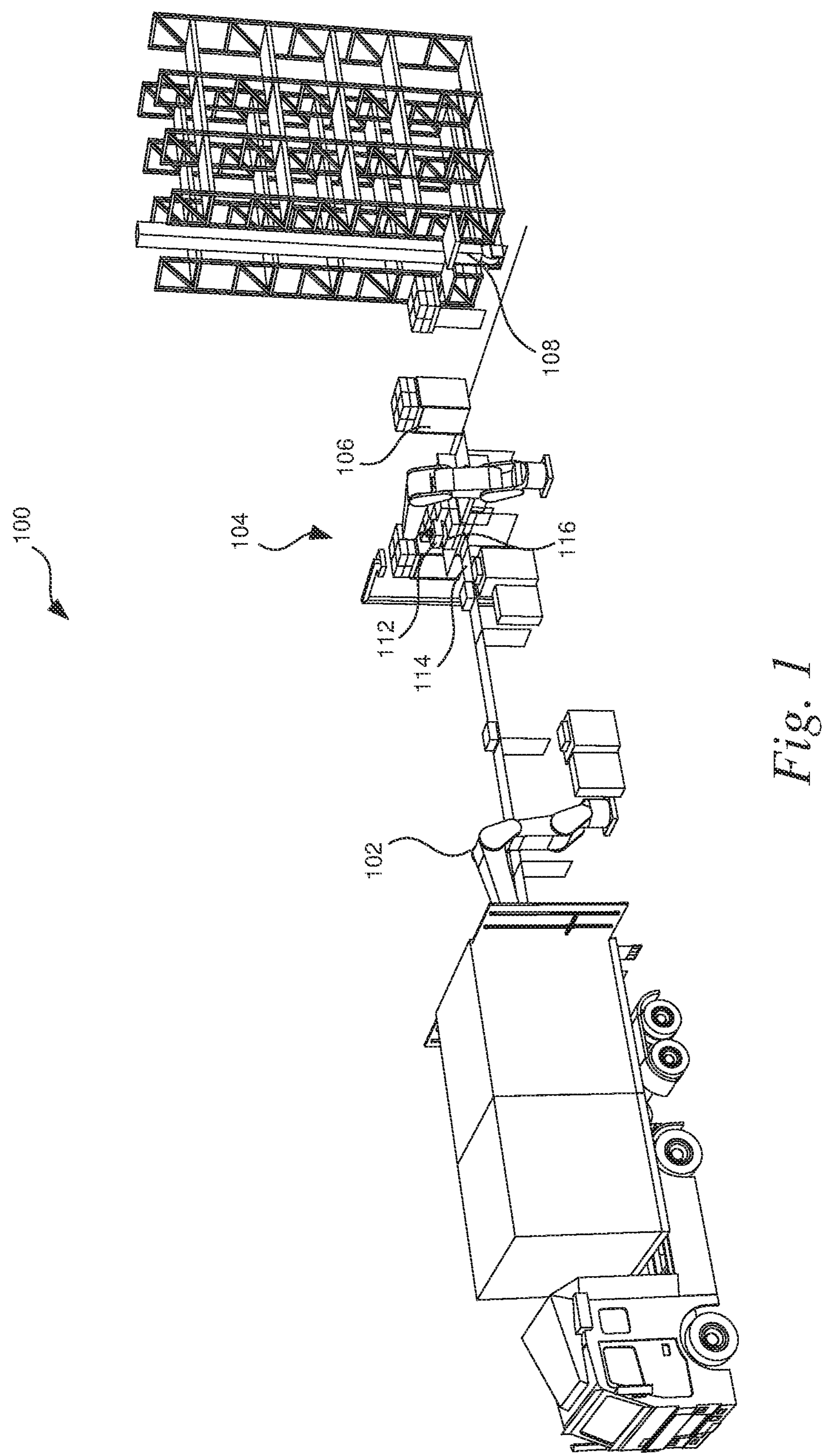
FIG. 1 illustrates an example environment in which a robotic system transports objects in accordance with one or more embodiments of the present technology.

Systems and methods for deriving estimations based on one or more measurements (e.g., depth measures) captured during task execution are described herein. In some implementations, a robotic system may be configured to transfer one or more objects (e.g., boxes, packages, objects, etc.) from a start location (e.g., a pallet, a bin, a conveyor, etc.) to a task location (e.g., a different pallet, bin, conveyor, etc.). The robotic system can obtain a set or a sequence of image data (e.g., two-dimensional (2D) and/or three-dimensional (3D) image data) depicting the start location and/or the task location during a transfer of the corresponding objects. The robotic system can use the image data to estimate and/or derive various implementation conditions, such as a quantity of the objects in a stack, a verification of pick/placement, a detection in object disruptions, etc.

In the following, numerous specific details are set forth to provide a thorough understanding of the presently disclosed technology. In other embodiments, the techniques introduced here can be practiced without these specific details. In other instances, well-known features, such as specific functions or routines, are not described in detail in order to avoid unnecessarily obscuring the present disclosure. References in this description to "an embodiment," "one embodiment," or the like mean that a particular feature, structure, material, or characteristic being described is included in at least one embodiment of the present disclosure. Thus, the appearances of such phrases in this specification do not necessarily all refer to the same embodiment. On the other hand, such references are not necessarily mutually exclusive either. Furthermore, the particular features, structures, materials, or characteristics can be combined in any suitable manner in one or more embodiments. It is to be understood that the various embodiments shown in the figures are merely illustrative representations and are not necessarily drawn to scale.

Several details describing structures or processes that are well-known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments can have different configurations or different components than those described in this section. Accordingly, the disclosed techniques can have other embodiments with additional elements or without several of the elements described below.

Many embodiments or aspects of the present disclosure described below can take the form of computer- or controller-executable instructions, including routines executed by a programmable computer or controller. Those skilled in the relevant art will appreciate that the disclosed techniques can be practiced on computer or controller systems other than those shown and described below. The techniques described herein can be embodied in a special-purpose computer or data processor that is specifically programmed, configured, or constructed to execute one or more of the computer-executable instructions described below. Accordingly, the terms "computer" and "controller" as generally used herein refer to any data processor and can include Internet appliances and handheld devices (including palm-top computers, wearable computers, cellular or mobile phones, multi-processor systems, processor-based or programmable consumer electronics, network computers, mini computers, or the like). Information handled by these computers and controllers can be presented at any suitable display medium, including a liquid crystal display (LCD). Instructions for executing computer- or controller-executable tasks can be stored in or on any suitable computer-readable medium, including hardware, firmware, or a combination of hardware and firmware. Instructions can be contained in any suitable memory device, including, for example, a flash drive, USB device, and/or other suitable media, including a tangible, non-transient computer-readable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements cooperate or interact with each other (e.g., as in a cause-and-effect relationship, such as for signal transmission/reception or for function calls), or both.

Suitable Environments

FIG. 1 is an illustration of an example environment in which a robotic system 100 transports objects in accordance with one or more embodiments of the present technology. The robotic system 100 can include and/or communicate with one or more units (e.g., robots) configured to execute one or more tasks. Aspects of the object detection/update can be practiced or implemented by the various units.

For the example illustrated in FIG. 1, the robotic system 100 can include and/or communicate with an unloading unit 102, a transfer unit 104 or a transfer assembly (e.g., a palletizing robot and/or a piece-picker robot), a transport unit 106, a loading unit 108, or a combination thereof in a warehouse or a distribution/shipping hub. Each of the units in the robotic system 100 can be configured to execute one or more tasks. The tasks can be combined in sequence to perform an operation that achieves a goal, such as to unload objects from a truck or a van and store them in a warehouse or to unload objects from storage locations and prepare them for shipping. For another example, the task can include placing the objects on a task location (e.g., on top of a pallet and/or inside a bin/cage/box/case). As described below, the robotic system can derive plans (e.g., placement locations/orientations, a sequence for transferring the objects, and/or corresponding motion plans) for placing and/or stacking the objects. Each of the units can be configured to execute a sequence of actions (e.g., by operating one or more components therein) according to one or more of the derived plans to execute a task.

In some embodiments, the task can include manipulation (e.g., moving and/or reorienting) of a target object 112 (e.g., one of the packages, boxes, cases, cages, pallets, etc., corresponding to the executing task), such as to move the target object 112 from a start location 114 to a task location 116. For example, the unloading unit 102 (e.g., a devanning robot) can be configured to transfer the target object 112 from a location in a carrier (e.g., a truck) to a location on a conveyor belt. Also, the transfer unit 104 can be configured to transfer the target object 112 from one location (e.g., the conveyor belt, a pallet, or a bin) to another location (e.g., a pallet, a bin, etc.). For another example, the transfer unit 104 (e.g., a palletizing robot) can be configured to transfer the target object 112 from a source location (e.g., a pallet, a pickup area, and/or a conveyor) to a destination pallet. In completing the operation, the transport unit 106 can transfer the target object 112 from an area associated with the transfer unit 104 to an area associated with the loading unit 108, and the loading unit 108 can transfer the target object 112 (e.g., by moving the pallet carrying the target object 112) from the transfer unit 104 to a storage location (e.g., a location on the shelves). Details regarding the task and the associated actions are described below.

For illustrative purposes, the robotic system 100 is described in the context of a shipping center; however, it is understood that the robotic system 100 can be configured to execute tasks in other environments/for other purposes, such as for manufacturing, assembly, packaging, healthcare, and/or other types of automation. It is also understood that the robotic system 100 can include and/or communicate with other units, such as manipulators, service robots, modular robots, etc., not shown in FIG. 1. For example, in some embodiments, other units can include a depalletizing unit for transferring the objects from cage carts or pallets onto conveyors or other pallets, a container-switching unit for transferring the objects from one container to another, a packaging unit for wrapping the objects, a sorting unit for grouping objects according to one or more characteristics thereof, a piece-picking unit for manipulating (e.g., for sorting, grouping, and/or transferring) the objects differently according to one or more characteristics thereof, or a combination thereof.

The robotic system 100 can include and/or be coupled to physical or structural members (e.g., robotic manipulator arms) that are connected at joints for motion (e.g., rotational and/or translational displacements). The structural members and the joints can form a kinetic chain configured to manipulate an end effector (e.g., the gripper) configured to execute one or more tasks (e.g., gripping, spinning, welding, etc.) depending on the use/operation of the robotic system 100. The robotic system 100 can include and/or communicate with the actuation devices (e.g., motors, actuators, wires, artificial muscles, electroactive polymers, etc.) configured to drive or manipulate (e.g., displace and/or reorient) the structural members about or at a corresponding joint. In some embodiments, the robotic units can include transport motors configured to transport the corresponding units/chassis from place to place.

The robotic system 100 can include and/or communicate with sensors configured to obtain information used to implement the tasks, such as for manipulating the structural members and/or for transporting the robotic units. The sensors can include devices configured to detect or measure one or more physical properties of the robotic system 100 (e.g., a state, a condition, and/or a location of one or more structural members/joints thereof) and/or of a surrounding environment. Some examples of the sensors can include accelerometers, gyroscopes, force sensors, strain gauges, tactile sensors, torque sensors, position encoders, etc.

In some embodiments, for example, the sensors can include one or more imaging devices (e.g., visual and/or infrared cameras, 2D and/or 3D imaging cameras, distance measuring devices such as lidars or radars, etc.) configured to detect the surrounding environment. The imaging devices can generate representations of the detected environment, such as digital images and/or point clouds, that may be processed via machine/computer vision (e.g., for automatic inspection, robot guidance, or other robotic applications). The robotic system 100 can process the digital image and/or the point cloud to identify the target object 112, the start location 114, the task location 116, a pose of the target object 112, or a combination thereof.

For manipulating the target object 112, the robotic system 100 can capture and analyze an image of a designated area (e.g., a pickup location, such as inside the truck or on the conveyor belt) to identify the target object 112 and the start location 114 thereof. Similarly, the robotic system 100 can capture and analyze an image of another designated area (e.g., a drop location for placing objects on the conveyor, a location for placing objects inside the container, or a location on the pallet for stacking purposes) to identify the task location 116. For example, the imaging devices can include one or more cameras configured to generate images of the pickup area and/or one or more cameras configured to generate images of the task area (e.g., drop area). Based on the captured images, as described below, the robotic system 100 can determine the start location 114, the task location 116, the associated poses, a packing/placement plan, a transfer/packing sequence, and/or other processing results.

In some embodiments, for example, the sensors can include position sensors (e.g., position encoders, potentiometers, etc.) configured to detect positions of structural members (e.g., the robotic arms and/or the end effectors) and/or corresponding joints of the robotic system 100. The robotic system 100 can use the position sensors to track locations and/or orientations of the structural members and/or the joints during the execution of the task.

Robotic Systems

Figure 2:
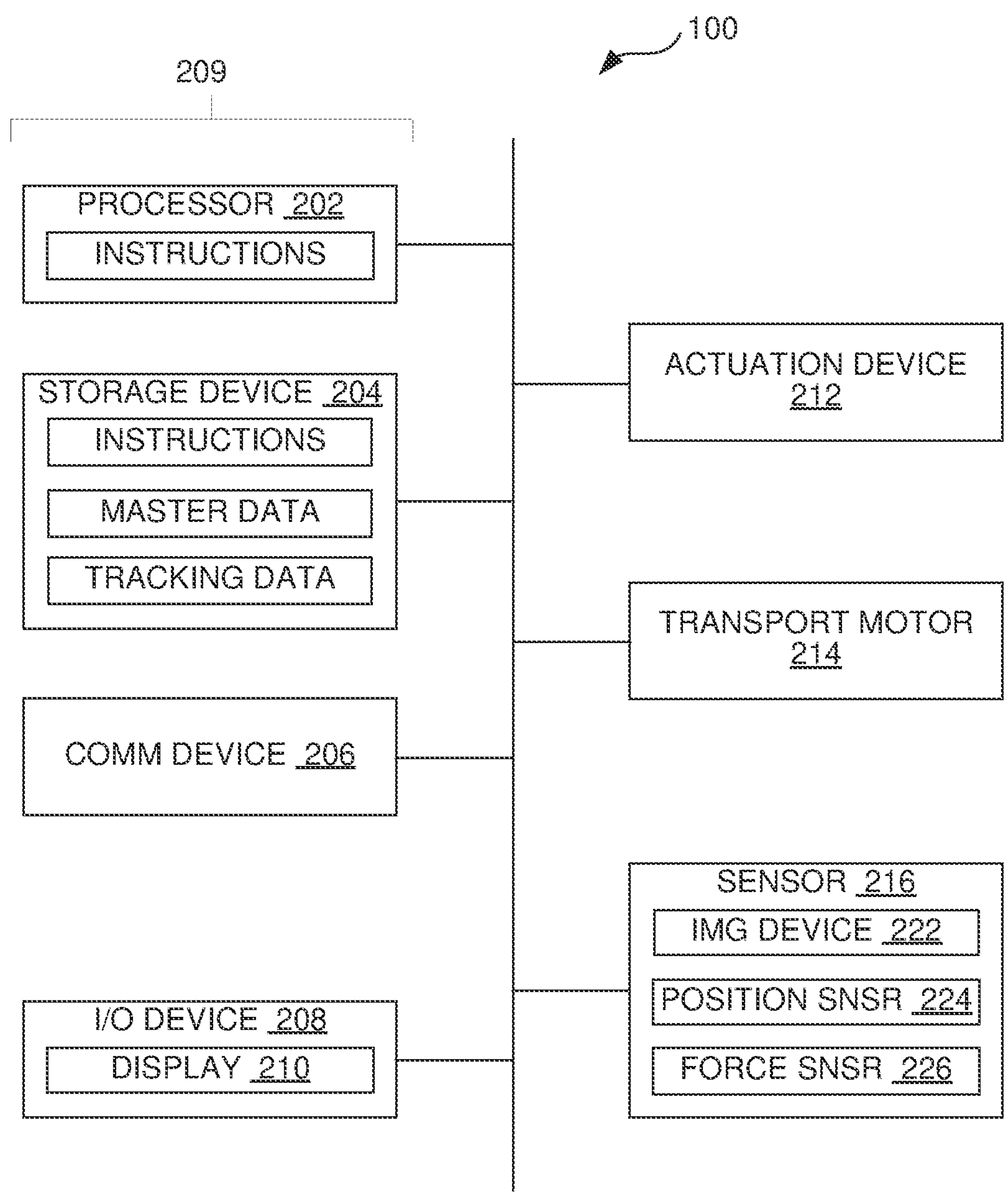
FIG. 2 is a block diagram illustrating the robotic system in accordance with one or more embodiments of the present technology.

FIG. 2 is a block diagram illustrating components of the robotic system 100 in accordance with one or more embodiments of the present technology. In some embodiments, for example, the robotic system 100 (e.g., at one or more of the units or assemblies and/or robots described above) can include electronic/electrical devices, such as one or more processors 202, one or more storage devices 204, one or more communication devices 206, one or more input-output devices 208, one or more actuation devices 212, one or more transport motors 214, one or more sensors 216, or a combination thereof. The various devices can be coupled to each other via wire connections and/or wireless connections. For example, one or more units/components for the robotic system 100 and/or one or more of the robotic units can include a bus, such as a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus (also referred to as "Firewire"). Also, for example, the robotic system 100 can include and/or communicate with bridges, adapters, controllers, or other signal-related devices for providing the wire connections between the devices. The wireless connections can be based on, for example, cellular communication protocols (e.g., 3G, 4G, LTE, 5G, etc.), wireless local area network (LAN) protocols (e.g., wireless fidelity (WIFI)), peer-to-peer or device-to-device communication protocols (e.g., Bluetooth, Near-Field communication (NFC), etc.), Internet of Things (IoT) protocols (e.g., NB-IoT, Zigbee, Z-wave, LTE-M, etc.), and/or other wireless communication protocols.

The processors 202 can include data processors (e.g., central processing units (CPUs), special-purpose computers, and/or onboard servers) configured to execute instructions (e.g., software instructions) stored on the storage devices 204 (e.g., computer memory). The processors 202 can implement the program instructions to control/interface with other devices, thereby causing the robotic system 100 to execute actions, tasks, and/or operations.

The storage devices 204 can include non-transitory computer-readable mediums having stored thereon program instructions (e.g., software). Some examples of the storage devices 204 can include volatile memory (e.g., cache and/or random-access memory (RAM)) and/or non-volatile memory (e.g., flash memory and/or magnetic disk drives). Other examples of the storage devices 204 can include portable memory drives and/or cloud storage devices.

In some embodiments, the storage devices 204 can be used to further store and provide access to master data, processing results, and/or predetermined data/thresholds. For example, the storage devices 204 can store master data that includes descriptions of objects (e.g., boxes, cases, containers, and/or products) that may be manipulated by the robotic system 100. In one or more embodiments, the master data can include a dimension, a shape (e.g., templates for potential poses and/or computer-generated models for recognizing the object in different poses), mass/weight information, a color scheme, an image, identification information (e.g., bar codes, quick response (QR) codes, logos, etc., and/or expected locations thereof), an expected mass or weight, or a combination thereof for the objects expected to be manipulated by the robotic system 100. In some embodiments, the master data can include manipulation-related information regarding the objects, such as a center-of-mass (COM) location on each of the objects, expected sensor measurements (e.g., force, torque, pressure, and/or contact measurements) corresponding to one or more actions/maneuvers, or a combination thereof. The robotic system can look up pressure levels (e.g., vacuum levels, suction levels, etc.), gripping/pickup areas (e.g., areas or banks of vacuum grippers to be activated), and other stored master data for controlling transfer robots. The storage devices 204 can also store object tracking data. In some embodiments, the object tracking data can include a log of scanned or manipulated objects. In some embodiments, the object tracking data can include image data (e.g., a picture, point cloud, live video feed, etc.) of the objects at one or more locations (e.g., designated pickup or drop locations and/or conveyor belts). In some embodiments, the object tracking data can include locations and/or orientations of the objects at the one or more locations.

The communication devices 206 can include circuits configured to communicate with external or remote devices via a network. For example, the communication devices 206 can include receivers, transmitters, modulators/demodulators (modems), signal detectors, signal encoders/decoders, connector ports, network cards, etc. The communication devices 206 can be configured to send, receive, and/or process electrical signals according to one or more communication protocols (e.g., the Internet Protocol (IP), wireless communication protocols, etc.). In some embodiments, the robotic system 100 can use the communication devices 206 to exchange information between units of the robotic system 100 and/or exchange information (e.g., for reporting, data gathering, analyzing, and/or troubleshooting purposes) with systems or devices external to the robotic system 100.

The input-output devices 208 can include user interface devices configured to communicate information to and/or receive information from human operators. For example, the input-output devices 208 can include a display 210 and/or other output devices (e.g., a speaker, a haptics circuit, or a tactile feedback device, etc.) for communicating information to the human operator. Also, the input-output devices 208 can include control or receiving devices, such as a keyboard, a mouse, a touchscreen, a microphone, a user interface (UI) sensor (e.g., a camera for receiving motion commands), a wearable input device, etc. In some embodiments, the robotic system 100 can use the input-output devices 208 to interact with the human operators in executing an action, a task, an operation, or a combination thereof.

In some embodiments, a controller (e.g., controller 209 of FIG. 2) can include the processors 202, storage devices 204, communication devices 206, and/or input-output devices 208. The controller can be a standalone component or part of a unit/assembly. For example, each unloading unit, transfer assembly, transport unit, and loading unit of the robotic system 100 can include one or more controllers. In some embodiments, a single controller can control multiple units or standalone components.

The robotic system 100 can include and/or communicate with physical or structural members (e.g., robotic manipulator arms) connected at joints for motion (e.g., rotational and/or translational displacements). The structural members and the joints can form a kinetic chain configured to manipulate an end effector (e.g., the gripper) configured to execute one or more tasks (e.g., gripping, spinning, welding, etc.) depending on the use/operation of the robotic system 100. The kinetic chain can include the actuation devices 212 (e.g., motors, actuators, wires, artificial muscles, electroactive polymers, etc.) configured to drive or manipulate (e.g., displace and/or reorient) the structural members about or at a corresponding joint. In some embodiments, the kinetic chain can include the transport motors 214 configured to transport the corresponding units/chassis from place to place. For example, the actuation devices 212 and transport motors 214 can be connected to or part of a robotic arm, a linear slide, or other robotic components.

The sensors 216 can be configured to obtain information used to implement the tasks, such as for manipulating the structural members and/or for transporting the robotic units. The sensors 216 can include devices configured to detect or measure one or more physical properties of the controllers, the robotic units (e.g., a state, a condition, and/or a location of one or more structural members/joints thereof), and/or for a surrounding environment. Some examples of the sensors 216 can include contact sensors, proximity sensors, accelerometers, gyroscopes, force sensors, strain gauges, torque sensors, position encoders, pressure sensors, vacuum sensors, etc.

In some embodiments, for example, the sensors 216 can include one or more imaging devices 222 (e.g., two-dimensional and/or three-dimensional imaging devices) configured to detect the surrounding environment. The imaging devices can include cameras (including visual and/or infrared cameras), lidar devices, radar devices, and/or other distance-measuring or detecting devices. The imaging devices 222 can generate a representation of the detected environment, such as a digital image and/or a point cloud, used for implementing machine/computer vision (e.g., for automatic inspection, robot guidance, or other robotic applications).

Referring now to FIGS. 1 and 2, the robotic system 100 (via, e.g., the processors 202) can process image data and/or the point cloud to identify the target object 112 of FIG. 1, the start location 114 of FIG. 1, the task location 116 of FIG. 1, a pose of the target object 112 of FIG. 1, or a combination thereof. The robotic system 100 can use image data from the imaging devices 222 to determine how to access and pick up objects. Images of the objects can be analyzed to determine (via, e.g., a planner system) a motion plan for positioning a vacuum gripper assembly to grip targeted objects. The robotic system 100 (e.g., via the various units) can capture and analyze an image of a designated area (e.g., inside the truck, inside the container, or a pickup location for objects on the conveyor belt) to identify the target object 112 and the start location 114 thereof. Similarly, the robotic system 100 can capture and analyze an image of another designated area (e.g., a drop location for placing objects on the conveyor belt, a location for placing objects inside the container, or a location on the pallet for stacking purposes) to identify the task location 116.

Also, for example, the sensors 216 of FIG. 2 can include position sensors 224 of FIG. 2 (e.g., position encoders, potentiometers, etc.) configured to detect positions of structural members (e.g., the robotic arms and/or the end effectors) and/or corresponding joints of the robotic system 100. The robotic system 100 can use the position sensors 224 to track locations and/or orientations of the structural members and/or the joints during the execution of the task. The unloading unit, transfer unit, transport unit/assembly, and loading unit disclosed herein can include the sensors 216.

In some embodiments, the sensors 216 can include one or more force sensors 226 (e.g., weight sensors, strain gauges, piezoresistive/piezoelectric sensors, capacitive sensors, elastoresistive sensors, and/or other tactile sensors) configured to measure a force applied to the kinetic chain, such as at the end effector. For example, the sensors 216 can be used to determine a load (e.g., the grasped object) on the robotic arm. The force sensors 226 can be attached to or about the end effector and configured such that the resulting measurements represent a weight of the grasped object and/or a torque vector relative to a reference location. In one or more embodiments, the robotic system 100 can process the torque vector, the weight, and/or other physical traits of the object (e.g., dimensions) to estimate the CoM of the grasped object.

Robotic Transfer Assembly

Figure 3:
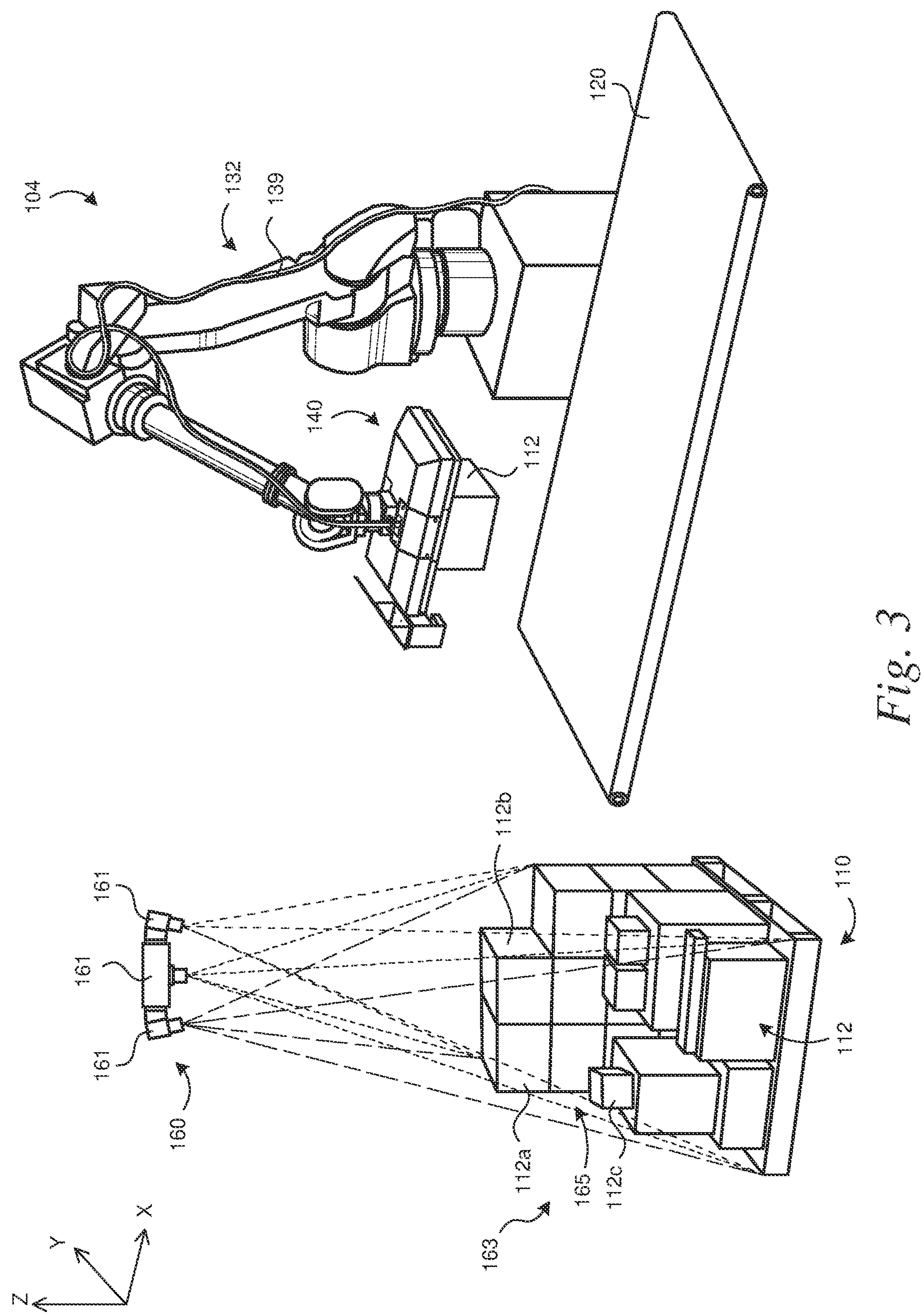
FIG. 3 illustrates a robotic transfer assembly in accordance with one or more embodiments of the present technology.

FIG. 3 illustrates the transfer unit 104 in accordance with one or more embodiments of the present technology. The transfer unit 104 can include an imaging system 160 and a robotic arm system 132. The imaging system 160 can provide image data captured from a target environment with a de-palletizing platform 110. The robotic arm system 132 can include a robotic arm assembly 139 and an end effector 140 (e.g., a gripper assembly). The robotic arm assembly 139 can position the end effector 140 above a group of objects in a stack 165 located at a pickup environment 163.

FIG. 3 shows the end effector 140 carrying a single target object 112 (e.g., a package) positioned above a conveyer 120 (e.g., a conveyer belt). The end effector 140 can release the target object 112 onto the conveyor 120, and the robotic arm system 132 can then retrieve packages 112*a*, 112*b* by positioning the unloaded end effector 140 directly above package 112*a*, package 112*b*, or both. The end effector 140 can then hold, via a vacuum grip, one or more of packages 112*a*, 112*b*, and the robotic arm system 132 can carry the retained packages 112*a* and/or 112*b* to a position directly above the conveyor 120. The end effector 140 can then release (e.g., simultaneously or sequentially) the packages 112*a*, 112*b* onto the conveyor 120. This process can be repeated any number of times to carry the objects from the stack 165 to the conveyor 120.

With continued reference to FIG. 3, the de-palletizing platform 110 can include any platform, surface, and/or structure upon which a plurality of target objects 112 (e.g., packages) may be stacked and/or staged when ready to be transported. The imaging system 160 can include one or more imaging devices 161 configured to capture image data of the packages 112*a*, 112*b* on the de-palletizing platform 110. The imaging devices 161 can capture distance data, position data, video, still images, lidar data, radar data, and/or motion at the pickup environment 163 or pickup region. It should be noted that, although the terms "object" and "package" are used herein, the terms include any other items capable of being gripped, lifted, transported, and delivered such as, but not limited to, "case," "box," "carton," or any combination thereof. Moreover, although polygonal boxes (e.g., rectangular boxes) are illustrated in the drawings disclosed herein, the shapes of the boxes are not limited to such shape but include any regular or irregular shape that, as discussed in detail below, is capable of being gripped, lifted, transported, and delivered.

Like the de-palletizing platform 110, the receiving conveyor 120 can include any platform, surface, and/or structure designated to receive the packages 112*a*, 112*b* for further tasks/operations. In some embodiments, the receiving conveyor 120 can include a conveyor system for transporting the target object 112 from one location (e.g., a release point) to another location for further operations (e.g., sorting and/or storage). In some embodiments, the robotic system 100 can include a second imaging system (not shown) configured to provide image data captured from a target environment with a target placement location (e.g., the conveyor 120). The second imaging system can capture image data of the packages 112*a*, 112*b* on the receiving/placement location (e.g., the receiving conveyor 120).

Task Implementation Processes

Figure 4A:
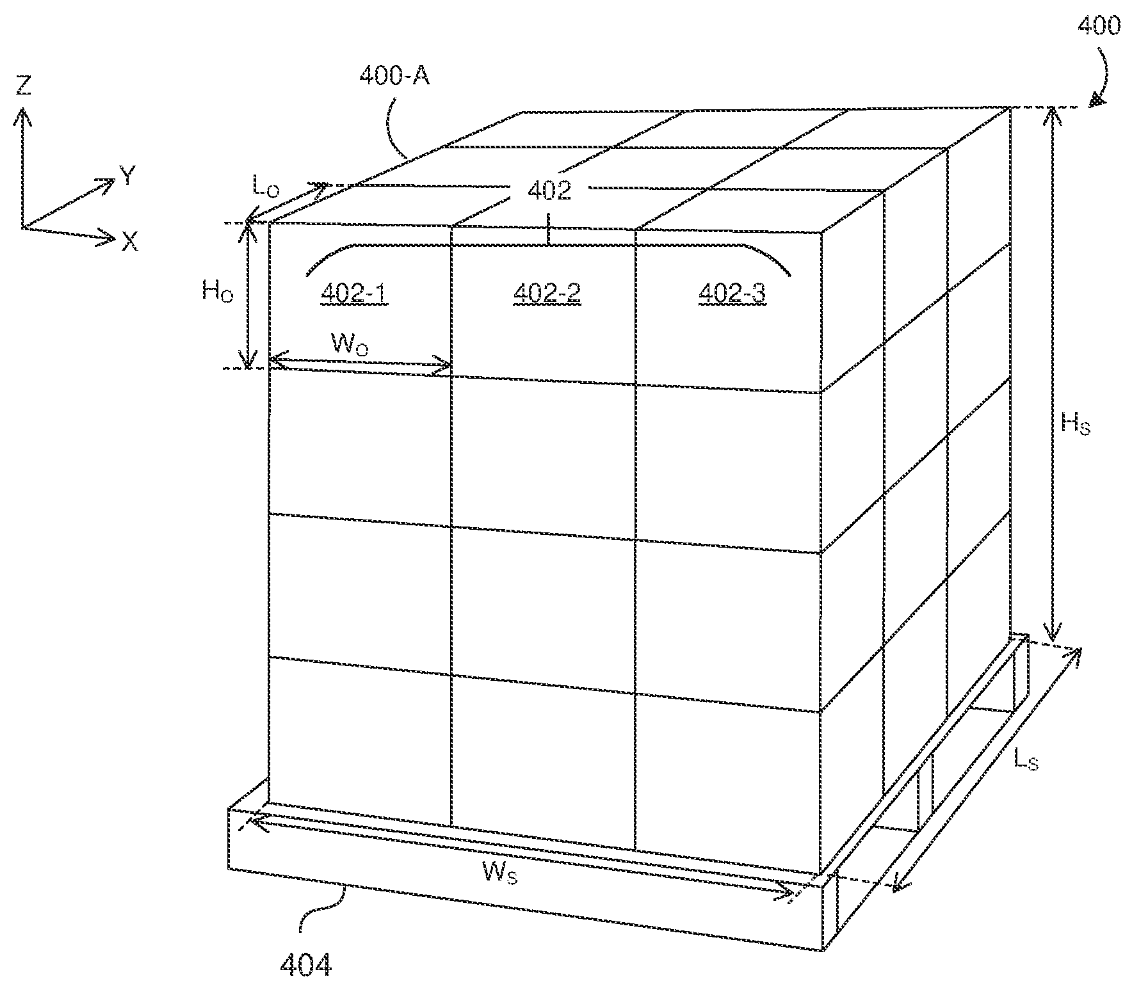
FIG. 4A illustrates an example first stack in accordance with one or more embodiments of the present technology.
Figure 4B:
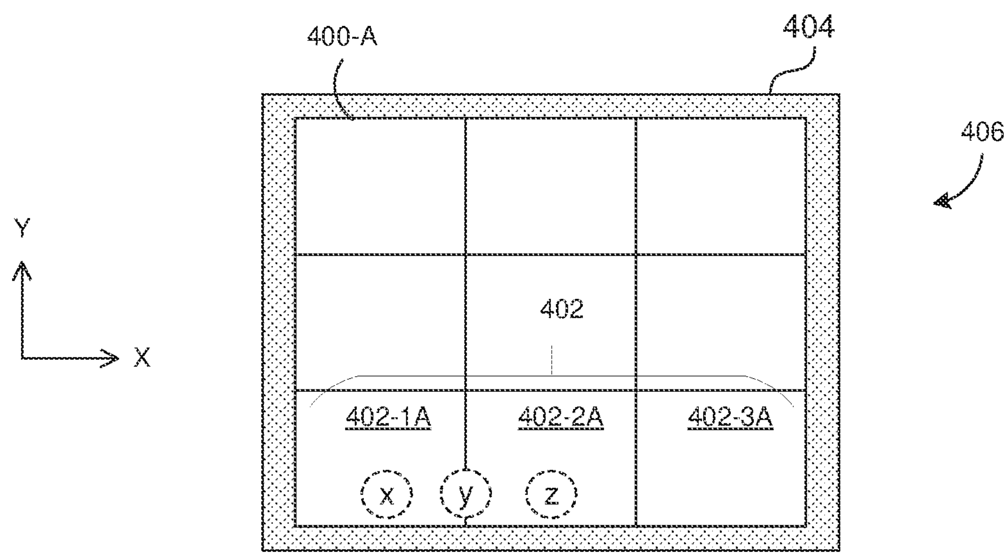
FIG. 4B illustrates an example image data depicting the first stack in accordance with one or more embodiments of the present technology.

FIG. 4A illustrates an example first stack 400 in accordance with one or more embodiments of the present technology. FIG. 4B illustrates an example image data 406 depicting the first stack 400 in accordance with one or more embodiments of the present technology. Referring now to FIG. 4A and FIG. 4B together, the image data 406 can represent a top view of the first stack 400 at the start location (e.g., the de-palletizing platform 110 of FIG. 3). The image data 406 can include 2D and/or 3D data from the imaging system 160 of FIG. 3.

As shown in FIG. 4A, the stack 400 (e.g., an object stack) includes objects 402 including objects (e.g., objects 402-1, 402-2, and 402-3) arranged in an organized pile. The stack 400 illustrated in FIG. 4A may correspond to an object stack positioned at a start location (e.g., the start location 114 in FIG. 1) before a transfer of any of the objects 402 in the object stack 400 to a task location (e.g., the task location 116 in FIG. 1). The image data 406 thereby represents a top view of the stack 400 at the start location at a point in time, such as prior to picking any of the objects from the stack 400 (e.g., the image data 406 may be referred to as preceding image data). The objects 402 may be arranged to satisfy an optimization condition, such as to minimize a total volume of the stack 400. In FIG. 4A, the objects 402 are arranged so that the object stack 400 has a co-planar, or substantially co-planar, top surface 400-A. The co-planar top surface 400-A is composed of co-planar or substantially co-planar top surfaces 402-1A, 402-2A, and 402-3A of the objects 402-1, 402-2, and 402-3, respectively, that are arranged adjacent to each other. In FIG. 4A, the object stack 400 has dimensions corresponding to a stack height ($H_S$), stack width ($W_S$), and stack length ($L_S$).

In some embodiments, the image data 406 can include a depth map that represents a distance between the imaging system 160 and a detected surface/point of objects within a field of view of the imaging system 160. For example, as described above, the imaging devices 222 can generate a representation of the environment detected in an image that corresponds to a depth map and/or a point cloud. The depth map can include depth measures (e.g., along a Z-direction) at discrete points along a lateral plane (e.g., at locations 'x,' 'y,' and 'z' along an X-Y plane illustrated in FIG. 4B). For the example illustrated in FIG. 4B, the image data 406 can depict the co-planar top surfaces (e.g., matching depth measures) of nine objects that form the top surface of the stack 400 (e.g., the co-planar or substantially co-planar top surfaces 402-1A, 402-2A, and 402-3-A of the objects 402-1, 402-2, and 402-3, respectively). The matching depth can correspond to a stack height ($H_s$ in FIG. 4A). The image data 406 may also depict depth measures for a top surface of a placement platform 404 (e.g., the pallet shown with a dotted fill). Adjacent or abutting edges of objects within the stack may or may not be readily detectable in the 3D image data. The stack height $H_S$ can correspond to a vertical distance between a corresponding top surface (e.g., the surface 400-A) of the object/stack and the top surface of the placement platform (e.g., a top surface of the placement platform 404).

The robotic system 100 can use the image data 406 to detect the objects 402 in the stack 400. The object detection can include estimating an identity and/or a location of an object depicted in the image data 406. In some embodiments, the robotic system 100 can process the image data 406 (e.g., the 2D and/or the 3D depictions) to identify corners and/or edges/lines (e.g., peripheral edges of the stack or a top layer thereof) depicted therein. Such identifying may include identifying corners and edges of the stack 400 and/or identifying corners and edges of the objects 402 in the stack 400. The robotic system 100 can process the corners and/or the edges to estimate a surface or peripheral boundaries for each of the depicted objects. The robotic system 100 can use the estimated boundaries to estimate the bounded surface (e.g., top surface) for each of the depicted objects. For example, the robotic system can estimate peripheral boundaries of surfaces 402-1A, 402-2A, and 402-3A of objects 402-1, 402-2, and 402-3, respectively, within the co-planar surface 400-A of stack 400. For example, the identification may include analyzing the 3D data of the image data 406 to identify stack corners, identifying edges within the 2D visual representation of the stack 400 (via, e.g., a Sobel filter), comparing portions of the 2D visual representations to templates of known objects within the master data, or a combination thereof. Also, for example, the identification may include applying other image detection methods including, e.g., algorithms that identify corners of boxes and packages. Furthermore, such image detection methods may be able to distinguish the corners and edges of the object from visual features on the object. For example, the robotic system can distinguish flaps, tape, or other visual features on the surface of the object from an actual edge of the object.

The robotic system 100 can process unrecognized/unmatched portions of the image data as corresponding to one or more unrecognized or unexpected objects. For example, an unrecognized portion of the image data 406 may correspond to an irregularly shaped object or a damaged object. The robotic system 100 can automatically or autonomously register the unexpected object during manipulation or task implementation. For example, the robotic system 100 can derive a minimum-viable region (MVR) for gripping the unexpected object. The robotic system 100 may use the MVR to grasp and lift and/or transfer the object from the start location to the task location. The robotic system 100 can detect the actual edges, the corresponding dimensions (e.g., lateral dimensions), and/or the visual surface image (e.g., the corresponding portion of the image data) of the unrecognized object based on the movement thereof. For example, the robotic system 100 can compare images taken before and after removal/movement of the unrecognized object to derive the dimensions (e.g., the lateral dimensions and/or the height) thereof. The robotic system 100 can further determine the height of the object during transfer, such as using crossing/line sensors and/or side-view cameras. The robotic system 100 can obtain other measurements or estimates, such as the weight, the CoM location, or the like, during the transfer of the object.

The robotic system 100 can use additional information that describes the content of the stack, such as shipping manifest, order receipt, task tracker (e.g., corresponding to a history of removed/transferred objects), or the like to process the objects (e.g., recognized and/or unrecognized objects). For example, the robotic system 100 can determine a preliminary list of expected objects based on the content description of the stack. During object detection, the robotic system 100 can compare the image data to registered descriptions of the objects on the preliminary list before other objects.

The robotic system 100 can use the object detection, the results from processing the image data, the master data, the stack description, and/or additional descriptive data to extrapolate additional information regarding the stack, the objects therein, and/or the status of task implementations. For example, the robotic system 100 can estimate the number of objects within the stack and/or the arrangement of the objects within the stack.

Quantity/Arrangement Estimation

As an illustrative example for the quantity estimation, the first stack 400 can include a set of single or common stock-keeping-units (SKUs) (e.g., a stack of a common/single type of object). As such, the objects 402 within the first stack 400 have the same dimensions, same surface features, same weight, etc.

The robotic system 100 may detect the single SKU makeup of the first stack 400 based on one or more factors, such as supplier data, shipping manifest, shape or appearance of the stack, or the like. Once detected, the robotic system 100 can leverage the commonality of the stacked objects 402 to derive additional information. For example, the robotic system 100 can estimate the number of the objects 402 within the stack 400 based on the one or more dimensions of the objects and/or the calculated volume of the stack. The robotic system 100 can use the depth map to determine peripheral edges of the stack 400 and the heights at various locations of the stack 400. The robotic system 100 can derive the lateral dimensions (e.g., length $L_O$ and width $W_O$) for the regions within the stack 400 having common depth measures (e.g., heights $H_O$ within a threshold range). The robotic system 100 can use the lateral dimensions and the corresponding height to calculate the volume of the corresponding region. The robotic system 100 can combine the calculated volume of the regions across the stack to calculate the overall volume. The robotic system 100 can calculate the estimated number of objects based on dividing the overall volume with a volume of one object (e.g., a combined product of object length ($L_o$), object height ($H_o$), and object width ($W_o$)). For example, in FIG. 4A, the object stack 400 has dimensions corresponding to a stack height ($H_S$), stack width ($W_s$), and stack length ($L_S$), and a volume ($V_S$) of the object stack 400 corresponds to $V_S=H_S \times W_s \times L_S$. It is noted that the volume of the object stack is defined based on the outermost edges and surfaces and does not take into account any spacings or gaps within the stack. A volume of an individual object (e.g., the object 402-1) in the object stack 400 has dimensions corresponding to an object height ($H_O$), object width ($W_O$), and object length ($L_O$), and a volume ($V_O$) of the object corresponds to $V_O=H_O \times W_O \times L_O$.

The robotic system 100 can also estimate the number of objects within a mixed SKU stack (e.g., a stack of various types of objects). The objects within a mixed SKU stack may have different dimensions, surface features, weights, etc. The robotic system 100 may estimate a stacking pattern based on the obtained information, such as the stack description, the common-height regions (e.g., the lateral dimensions, the shape, and/or the height thereof), the object detections for the top layer, or the like. The robotic system 100 may estimate the stacking pattern based on comparing the obtained information to a set of predetermined templates and/or based on processing the obtained information to a set of stacking rules. Additionally or alternatively, the robotic system 100 can use the volumes of expected SKUs to calculate a combination of SKU quantities that have an overall volume matching that of the stack.

Figure 5A:
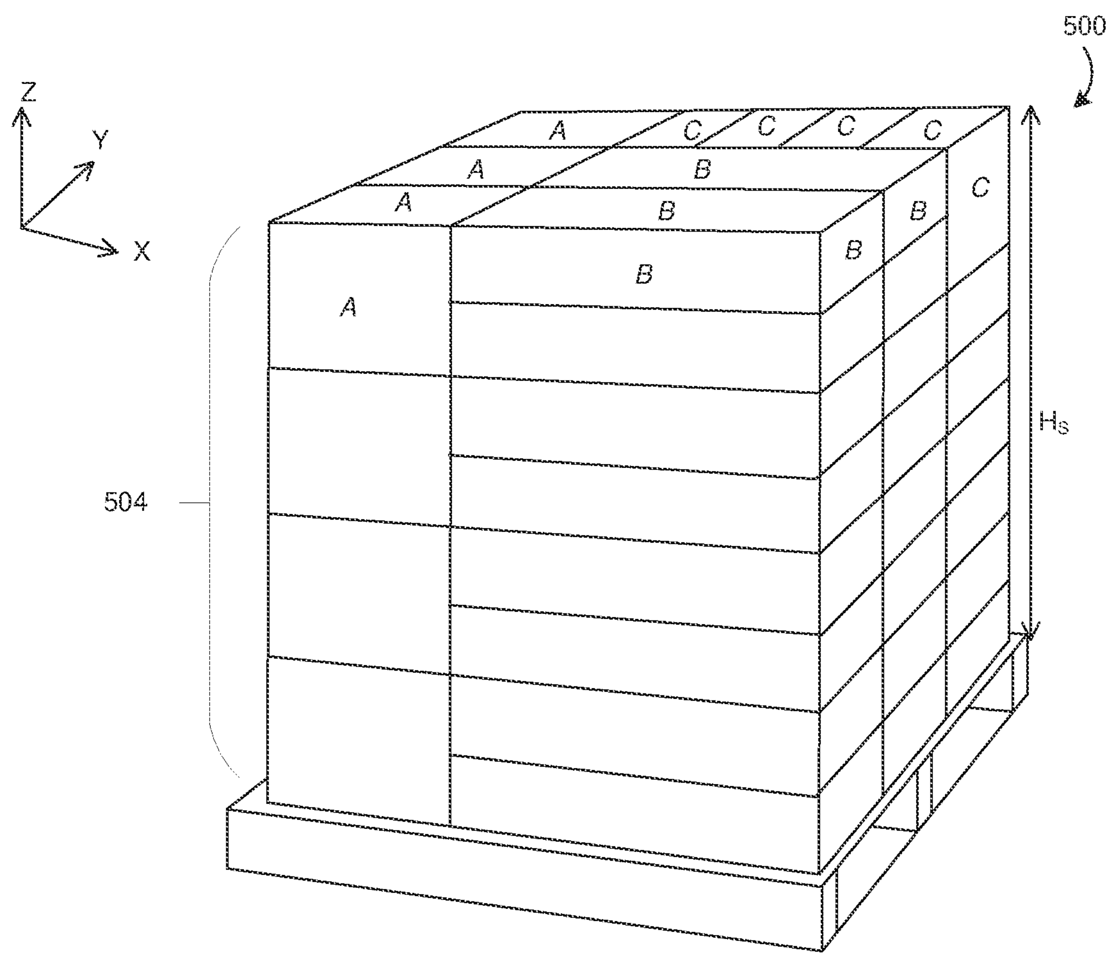
FIG. 5A illustrates an example second stack in accordance with one or more embodiments of the present technology.
Figure 5B:
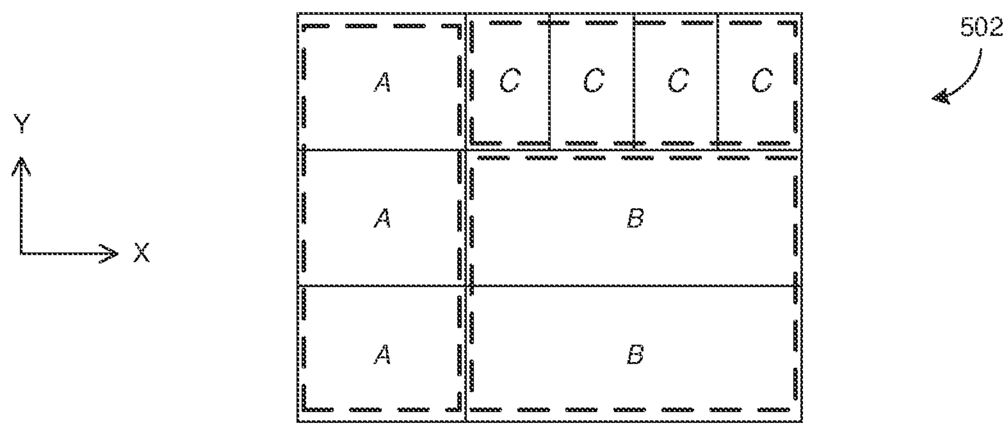
FIG. 5B illustrates an example image data depicting the second stack in accordance with one or more embodiments of the present technology.

As an illustrative example, FIG. 5A illustrates an example second stack 500, and FIG. 5B illustrates an example image data 502 depicting the second stack 500 in accordance with one or more embodiments of the present technology. Referring now to FIG. 5A and FIG. 5B together, the second stack 500 can be a mixed-SKU stack that includes 'A,' 'B,' and 'C' types of objects 504. As discussed above, the robotic system 100 can use the image data, the stack height measures, the object detection results, the overall shape of the stack, etc., to identify groupings of the objects or corresponding regions and/or the stacking configuration.

In some embodiments, the predetermined stacking configuration may dictate grouping objects of one type in a region/column (shown using dashed lines in FIG. 5B) on the pallet. For example, objects 504 of the type A are grouped together in a first column, objects 504 of the type B are grouped together in a second column, and objects 504 of the type C are grouped together in a third column. Additionally or alternatively, the shipping manifest or the stack description may indicate the stacking configuration of the objects according to one or more predetermined patterns. The robotic system 100 can calculate the volume of the region using the height and lateral dimensions of the regions (e.g., the height and lateral dimensions of the first, second, and third columns) and according to the stacking configuration. The robotic system 100 can divide the volume of the region by the volume of the corresponding objects. Alternatively, the robotic system 100 can calculate different combinations of quantities for the corresponding objects within the region to find a combination of quantities with the combined volume matching that of the region. The robotic system 100 can add the quantities for each SKU across the different regions to estimate the total number of objects per each type of SKU.

Status Estimation

In some embodiments, the robotic system 100 can use the obtained data to determine task implementation status, such as for validating object picking and/or placement. For the object picking/placement, the robotic system 100 may obtain a set or a sequence of image data obtained at different times (e.g., before and/or after a set of picks/placements).

For context, the robotic system 100 may derive a transfer sequence and/or a packing configuration (e.g., a set of placement locations for each object targeted to be placed at the task location) along with motion plans for the targeted objects. Each motion plan can include a set of commands and/or settings used to operate a robotic unit (e.g., the transfer unit 104 of FIG. 1, the robotic arm system 132 of FIG. 3, etc.) to transfer a corresponding set of objects from a start location to a task location. Accordingly, the beginning portion of the motion plan can correspond to a picking operation and/or the ending portion of the motion plan can correspond to a placement operation. The robotic system 100 can derive the motion plan such that the placement operation follows the packing configuration. Furthermore, the motion plans can be sequenced according to the transfer sequence.

The robotic system 100 can track the implementation of the motion plans using pick/placement history that follows the transfer sequence. The history can represent which object was picked from or placed at which location across time. The robotic system 100 (e.g., using a module/process separate from one implementing the transfers) can obtain and process additional image data during and/or after implementation of the motion plans. The robotic system 100 can compare the tracked history to the image data to validate the picks/placements of objects that occurred between the times of the images.

Figure 6A:
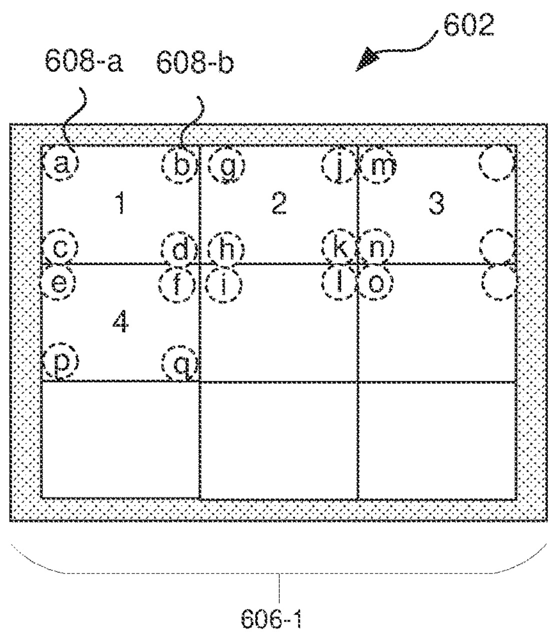
FIG. 6A illustrates a first image of a start location in accordance with one or more embodiments of the present technology.
Figure 6B:
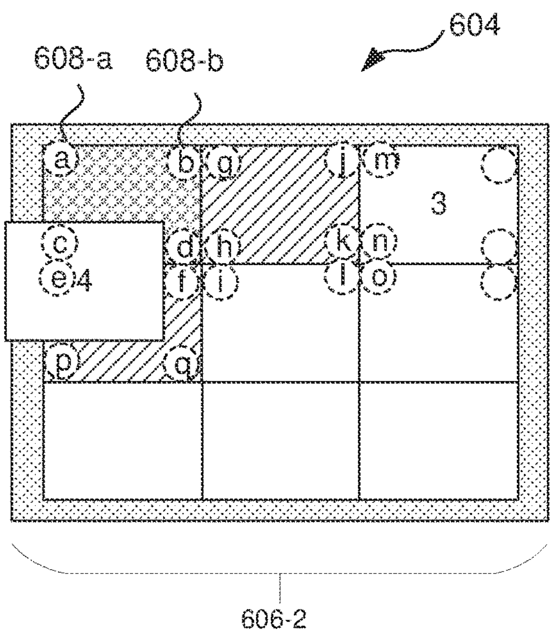
FIG. 6B illustrates a second image of the start location in accordance with one or more embodiments of the present technology.
Figure 7A:
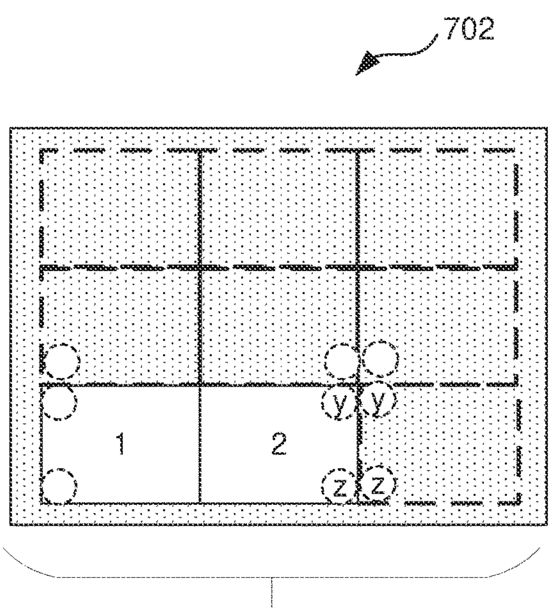
FIG. 7A illustrates a first image of a task location in accordance with one or more embodiments of the present technology.
Figure 7B:
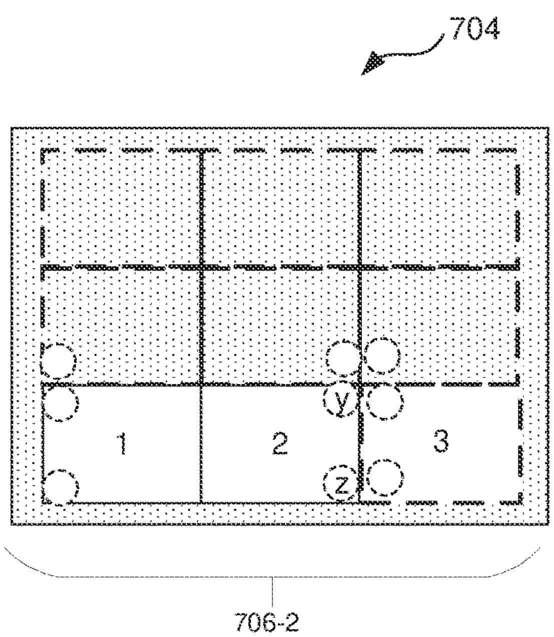
FIG. 7B illustrates a second image of the task location in accordance with one or more embodiments of the present technology.

For an example of the validation, FIG. 6A illustrates a first image 602 of a start location and FIG. 6B illustrates a second image 604 of the start location in accordance with one or more embodiments of the present technology. Similarly, FIG. 7A illustrates a first image 702 of a task location and FIG. 7B illustrates a second image 704 of the task location in accordance with one or more embodiments of the present technology. The first images 602/702 can depict the corresponding start/task location before picking or placing one or more objects, and the second images 604/704 can depict the location after picking or placing the one or more objects. In some embodiments, the first and second images can be sequential and represent two back-to-back images taken during the task implementation process.

For example, the first image 602 depicts a stack 606 corresponding to a stack at the start location before picking any objects (e.g., indicated as stack 606-1). As shown, in FIG. 6A stack 606-1 includes objects 1, 2, 3, and 4. The second image 604 depicts the stack 606 after picking (e.g., indicated as stack 606-2) a set of one or more objects. As shown, FIG. 6B illustrates the state of the stack 606-2 after objects 1 and 2 have been picked from the stack 606-2 (i.e., objects 1 and 2 are not illustrated in FIG. 6B) and object 4 has shifted. The shift in object 4 can be an unintended/unplanned event resulting from picking the objects 1 and/or 2. The first image 702 depicts a stack 706 corresponding to a stack at the task location after placing one or more objects (e.g., indicated as stack 706-1) and the second image 704 depicts the stack 706 after placing one or more additional objects (e.g., indicated as stack 706-2). As shown, in FIG. 7A stack 706-1 includes objects 1 and 2 (e.g., objects that have already been placed on the stack 706-1). FIG. 7B further includes an object 3 that has been subsequently placed in the stack 706-2.

The robotic system 100 can compare the depth measures (illustrated using different fills in FIGS. 6A through 7B) at and/or around picked objects to validate the object picking. The comparison of the depth measures may include a comparison of depth measures at specific locations on top surfaces of the objects. For example, when the difference in depth measures across the first and second images 602 and 604 is greater than a pick validation threshold, the robotic system 100 can determine that the targeted object was successfully picked. A pick validation threshold can correspond to an expected minimum height of an object. For example, objects at a pick location are expected to have a particular minimum height. If a difference in depth measures across the first and second images 602 and 604 is equal to, or greater than, the particular minimum height, the robotic system 100 can determine that the targeted object was successfully picked. The pick validation threshold can also correspond to an expected minimum height of a respective targeted object. In some embodiments, the robotic system 100 can identify comparison locations (e.g., locations illustrated using symbols {a, b, c, . . . } inside circles with dashed lines in FIGS. 6A through 7B, including locations 608-*a* and 608-*b*) for one or more objects. Instead of comparing the depth measures across the entireties of the depth maps/images, the robotic system 100 can compare the depth measures at the comparison locations to increase the processing efficiency. The robotic system 100 can identify the comparison locations as locations (e.g., X-Y coordinates) at or within a threshold distance/orientation from object edges or corners. The robotic system 100 can identify the comparison locations on one or both sides of the estimated peripheral edge of the picked object. In some embodiments, the robotic system 100 can identify the comparison locations to include an estimated center portion of the object detection and/or the MVR. Additionally or alternatively, the robotic system 100 can compare the difference in depth measures to the height of the picked object (e.g., when the object matches a registration record in the master data) to validate that the picked object matches the detected object. When the difference in the depth measures matches the height of the picked object, the robotic system 100 may further validate a successful pick and/or an undamaged pick (e.g., indicating that no objects were crushed).

The robotic system 100 can compare the heights at specific locations, such as the comparison locations about each estimated object corner, to validate the pick and/or changes in surrounding objects (e.g., object shifts or crushed objects). Using FIGS. 6A and 6B to illustrate examples of a pick validation, the robotic system 100 can detect a valid pick for object 2 due to the differences in depth measures at comparison locations for object 2 {g, h, j, k} and constant depth measures at surrounding locations {i, l, m, n, o}. In contrast, the robotic system 100 can detect a pick abnormality when the depth measures at the comparison locations (e.g., locations {a, b, c, d}) and/or the surrounding locations (e.g., {e, f, p, q}) are incongruent with a pick, such as illustrated for object 1. In response to the abnormality detection, the robotic system 100 can additionally review the depth measures and/or the visual images to determine potential failure modes.

In some embodiments, the robotic system 100 can determine that the robotic system 100 failed to pick the object (e.g., object 1) when the depth measures for the object locations (e.g., locations {a, b, c, d}) stay constant across images (not shown). When the failed pick mode is eliminated, the robotic system 100 can determine a potential misidentification or a crushed object when the differences in depth measures at the object locations (e.g., locations {a, b, c, d}) do not match the expected height of the removed object 1. The robotic system 100 can determine a misidentification when the depth measures for the removed object in the second image 604 (e.g., representative of a top surface of a newly exposed object below the removed object) have a non-planar pattern. Otherwise, the robotic system 100 can process the data to determine whether a surrounding object shifted or an object below was crushed. The robotic system 100 can determine that a surrounding object (e.g., object 4 in FIG. 6B) shifted when locations corresponding to the removed object (e.g., location {c}) match the height of the surrounding object, the difference in depth measures indicates a different location of a surface, and/or other locations of the surrounding object (e.g., locations {f, p, q}) correspond to unexpected differences. In some embodiments, the robotic system 100 can cache or store the object shift and adjust one or more corresponding motion plans accordingly, such as by adjusting the pick/grip pose.

As additional examples (not shown in FIGS. 6A and 6B) of the abnormality processing, the robotic system 100 may determine a potential misdetection of object 1 when the differences in depth measures at {a, b, c, d} represent a flat plane and do not match the expected height (e.g., according to the object detection) of object 1. The robotic system 100 can determine a potential crushed object below the picked object when the differences in depth measures at {a, b, c, d} or other points for the picked object are irregular or do not correspond to a planar pattern. The robotic system 100 can determine a potential crushed object around the picked object when the depth measures for surrounding non-picked objects (e.g., locations {i, l, e, f}) are different across images and/or when heights of the surface of the surrounding object do not correspond to a planar surface in the second image 604. The robotic system 100 can further determine the transferred object as a potential crushed object when the differences in the depth measures at the start location across the pick operations do not match (e.g., is greater than) the differences in the depth measures at the task location across the corresponding placement operations. The robotic system 100 can determine a double pick when differences in the depth measures for the surrounding object (e.g., locations {i, l, e, f}) match the height of the surrounding object and/or the corresponding lateral shape/dimensions match that of the surrounding object. A double pick corresponds to an instance when the end effector of the robotic arm grasps and transfers one or more unintended objects along with the target object. For example, the robotic arm unintentionally grasps and transfers object 2 together with the intended object 1.

Similar to the pick validation process, the robotic system 100 can use the differences in depth measures at the task location to validate object placements and/or determine associated failures. Using FIGS. 7A and 7B for an illustrative example, the robotic system 100 can determine a placement validation of object 2 when the change in depth measures at the targeted placement location (e.g., locations {y, z}) matches the expected height of object 2. The robotic system 100 can further validate the placement and/or eliminate other failure modes when depth measures for other comparison locations remain constant across the images 702 and 704. The robotic system 100 can determine potential error modes, such as crushed objects, shift in previously placed objects, misplaced target object, misidentified target object, or the like, using analysis similar to the picking abnormalities described above.

The robotic system 100 can use the determined failure mode to control/implement subsequent operations. For example, the robotic system 100 can obtain and/or analyze additional data, such as the weight of the object in transfer, additional images, updated object detections, or the like. Also, the robotic system 100 may determine and initiate a new process, such as abandoning the current set of plans (e.g., the motion plans, the packing configuration, the transfer sequence, etc.), notifying a human operator, determining/implementing error recovery (e.g., adjusting one or more objects at the start/task location), or the like.

Operational Flow

Figure 8:
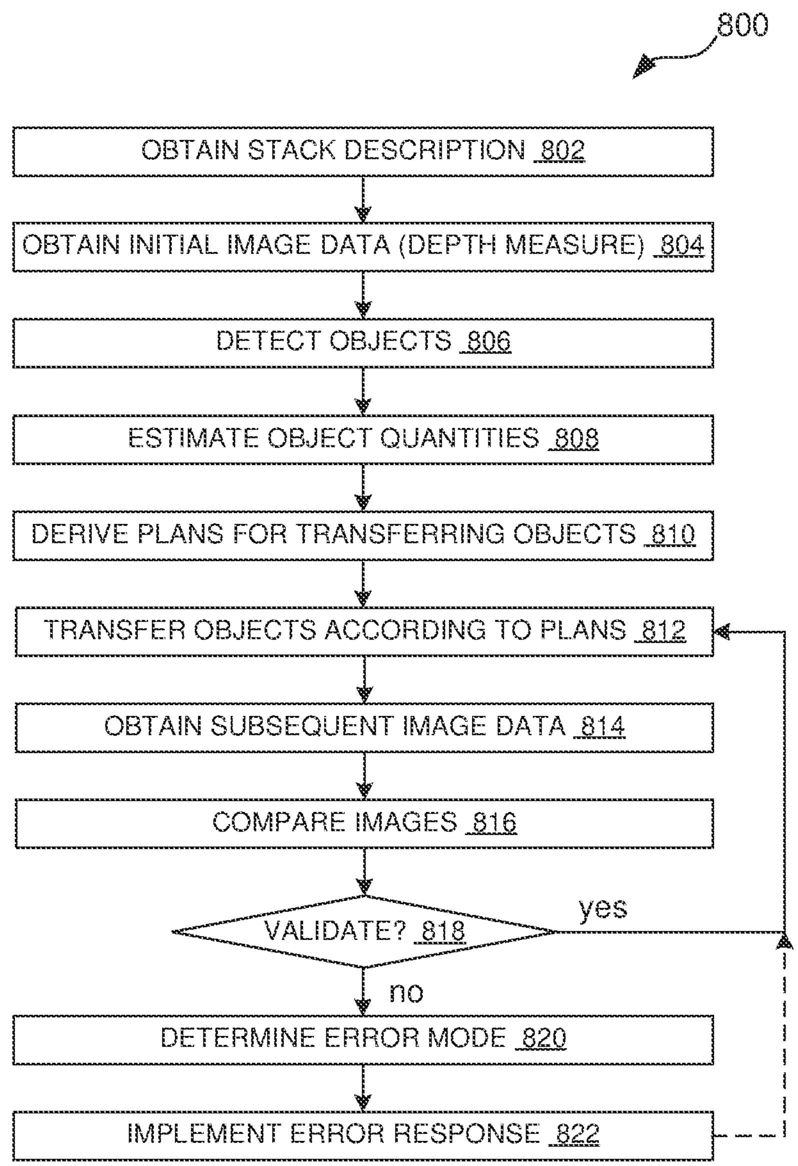
FIG. 8 is a flow diagram for operating a robotic system in accordance with one or more embodiments of the present technology.

FIG. 8 is a flow diagram of an example method 800 for operating a robotic system (e.g., the robotic system 100 of FIG. 1) in accordance with one or more embodiments of the present technology. The method 800 can be for deriving estimations (e.g., object quantities and/or implementation status) based on one or more measurements (e.g., depth measures) captured during task execution. The method 800 can be implemented based on executing the instructions stored on one or more of the storage devices 204 of FIG. 2 with one or more of the processors 202 of FIG. 2. In implementing the motion plan and/or the method 800, the processors 202 can send the motion plan or an associated set/sequence of commands/settings to the robotic unit(s) (e.g., the transfer unit 104 of FIG. 3 and/or the end effector 140 of FIG. 3). Accordingly, the transfer unit 104 and/or the end effector 140 can execute the motion plan to grasp and transfer the packages.

At block 802, the robotic system 100 can obtain stack descriptions, such as shipping manifests, order receipts, or the like. At block 804, the robotic system 100 can obtain initial image data depicting one or more corresponding locations (e.g., the start location and/or the task location at t=x and before execution of one or more tasks). The robotic system 100 can use the imaging systems, sensors, and/or cameras. The obtained image data can include 2D images and/or 3D images (e.g., depth maps) depicting the object stack and/or the corresponding platforms (e.g., bins, pallets, conveyor, etc.). The stack description may identify whether a stack is a common SKU (e.g., the stack 400 in FIG. 4A) or a mixed SKU (e.g., the stack 500 in FIG. 5A). The stack description may further include information regarding grouping of the objects in the stack. For example, as shown in FIGS. 5A and 5B, objects 504 of the type A are grouped together in a first column, objects 504 of the type B are grouped together in a second column, and objects 504 of the type C are grouped together in a third column.

At block 806, the robotic system 100 can process the obtained images to detect the depicted objects. For example, the robotic system 100 can detect the edges, identify surfaces, and/or compare the images of the surfaces to the master data to detect the objects. Detecting the objects can include identifying a type or an SKU and estimating a real-world location thereof based on the image processing.

At block 808, the robotic system 100 can estimate object quantities at least partially based on the initial image(s) and/or the object detection results. The robotic system 100 can estimate the object quantities based on the depth measures, arrangement of the detected objects, estimated arrangement of the objects, number of SKUs in the stack, etc., as described above with respect to FIGS. 4A through 5B. In some embodiments, the robotic system 100 can use the estimated quantities to process subsequent processing steps, such as for coordinating storage locations, storage containers, corresponding transport mechanisms, or the like. The robotic system 100 can further use the estimated quantities to verify the task planning (e.g., task sequences) and/or the task execution/progress.

At block 810, the robotic system 100 can derive plans (e.g., motion plans, transfer sequence, packing plan, etc.) for the objects in the stack. The robotic system 100 can derive the plans based on a predetermined process, such as by deriving placement locations for each object that satisfies a set of predetermined rules, deriving a sequence of object transfers to achieve the packing plan, and/or deriving the motion plans from iterating potential locations from the placement locations/poses to the start location.

At block 812, the robotic system 100 can transfer the objects in the stack, such as by implementing the motion plan according to the planned sequence. At block 814, the robotic system 100 can obtain subsequent image data during object transfer (e.g., implementation of motion plans). The robotic system 100 can obtain images (e.g., 2D images and/or 3D depth maps) before and/or after transfer of one or more subsets of objects within the stack (e.g., as described with respect to FIGS. 6A through 7B). The robotic system 100 can obtain depictions of the start locations and the remaining objects and/or depictions of the task locations and the newly placed objects.

At block 816, the robotic system 100 can compare the obtained image data with the preceding image. For example, the robotic system 100 compares the second image 604 in FIG. 6B obtained after pick of one or more objects from the start location to the first image 602 in FIG. 6A. Similarly, the robotic system 100 compares the second image 704 in FIG. 7B obtained after placement of one or more objects from the start location to the first image 702 in FIG. 7A. For example, the robotic system 100 can compare the depth measures, such as by calculating the differences in the depth measures across the images as described above. Calculating the differences in the depth measures may include calculating differences in the depth measures across the surfaces of the objects in the depicted stack. Alternatively, calculating the differences in the depth measures may include calculating differences in the depth measures across specific locations on the surfaces of the objects in the depicted stack (e.g., locations {a, b, c, d, . . . } in FIG. 6A).

At decision block 818, the robotic system 100 can analyze the comparisons to determine whether the corresponding pick and/or placement can be validated. For example, the robotic system 100 can evaluate the changes in the depth measure at one or more locations associated with and/or surrounding the picked/placed object for validation as described above. When the pick/placement is validated, the robotic system 100 can continue with the initially planned transfer without any adjustments. When the pick/placement is determined to be invalid, the robotic system 100 can determine an error mode as illustrated at block 820. The robotic system 100 can analyze the depth measures, images, pick history, or other data/results to determine the appropriate error mode, such as for the crushed objects, shifted objects, object misdetections, or the like described above.

As described with respect to FIGS. 6A and 6B, the robotic system 100 can compare the heights at specific locations (e.g., the comparison locations at the object corners in FIG. 6A) of the surrounding objects to validate the pick and/or changes in the surrounding objects. For example, with reference to FIGS. 6A and 6B, the robotic system 100 may detect a valid pick for object 2 due to the differences in depth measures at comparison locations for object 2 {g, h, j, k} and constant depth measures at surrounding locations {i, l, m, n, o}. The robotic system 100 may detect a pick abnormality when the depth measures at the comparison locations (e.g., locations {a, b, c, d}) and/or the surrounding locations (e.g., {e, f, p, q}) are incongruent with a pick. For example, the robotic system 100 can determine that the robotic system 100 failed to pick the object (e.g., object 1 in FIGS. 6A and 6B) when the depth measures for the object locations (e.g., locations {a, b, c, d} of object 1) stay constant across images. Another pick abnormality can include misidentification of the picked object. For example, the robotic system 100 determines a misidentification when the depth measures for the removed object in the second image 604 (e.g., representative of a top surface of a newly exposed object below the removed object) have a non-planar pattern. The non-planar pattern may be an indication that a surrounding object has been shifted and/or an object below the transferred object has been damaged. Yet another pick abnormality can include misdetection of the picked object. For example, the robotic system 100 may determine a misdetection of the transferred object when the differences in the depth measures at the transferred object (e.g., locations {a, b, c, d} at object 1) represent a flat plane that does not match the expected height (e.g., according to the object detection) of the transferred object. The robotic system 100 may also determine a double pick when differences in the depth measures for the surrounding object (e.g., locations {i, l, e, f} in FIG. 6B) match the height of the surrounding object and/or the corresponding lateral shape/dimensions match that of the surrounding object. This indicates that the surrounding object was unintentionally removed together with the transferred object.

At block 822, the robotic system 100 can implement an error response according to the determined error mode. The robotic system 100 can implement the error response according to a predetermined set of rules. The implemented responses can include notifying a human operator, abandoning the transfer plans, and/or implementing an error recovery process. Some example error recovery processes may include redetecting objects, replanning transfers, regripping objects, restacking shifted objects, removing obstacles or crushed objects, or the like. The robotic system 100 may continue implementing transfer objects when the recovery process is successful and/or when the detected error mode represents conditions for continuing implementations. In some embodiments, the robotic system can cache the differences, such as by calculating a change in distance and/or poses for shifted objects. The robotic system can adjust the corresponding motion plans, such as by altering the approach and grip locations, according to the calculated change measure. The robotic system can continue transferring the objects using the adjusted motion plans.

Embodiments

In accordance with some embodiments, a method of operating a robotic system (e.g., the robotic system 100 in FIG. 1) includes obtaining image data of a start location (e.g., the images 602 and 604 described with respect to FIGS. 6A and 6B) and a task location (e.g., the images 702 and 704 described with respect to FIGS. 7A and 7B) for transferring objects from an object stack at the start location to an object stack at the task location. The image data include a sequence of images depicting transferring one or more objects from the start location to the task location. The sequence of images includes a first image set depicting the start location and the task location before transferring the one or more objects (e.g., FIGS. 6A and 7A) and a second image set depicting the start location and the task location after transferring the one or more objects (e.g., FIGS. 6B and 7B). The image data include depth measures determined from each image in the sequence of images. The depth measures are representative of estimated heights of surfaces at the start location and estimated heights of surfaces at the task location (e.g., the estimated heights illustrated using different fills in FIGS. 6A through 7B). The method includes determining a first depth difference between depth measures representative of the estimated heights of the surfaces at the start location in the first image set and the second image set (e.g., the depth difference between the first image 602 and the second image 604 at locations {g, h, j, k} in FIGS. 6A and 6B). The method includes validating, in accordance with a determination that the first depth difference is greater than a pick validation threshold, that a target object of the one or more objects was successfully picked from the start location (e.g., object 2 was picked from the start location). The method includes determining a second depth difference between depth measures representative of the estimated heights of the surfaces at the task location in the first image set and the second image set (e.g., the depth difference between the first image 702 and the second image 704 at locations {y, z} in FIGS. 7A and 7B). The method includes validating, in accordance with a determination that the second depth difference is greater than a placement validation threshold, that the target object of the one or more objects was placed at the task location (e.g., object 2 was placed at the task location). For example, the target object of the one or more objects was placed at the task location for the targe object according to a motion plan. A placement validation threshold, similar to the pick validation threshold described above, can correspond to an expected minimum height of an object. For example, the transferred object is expected to have a particular minimum height. If the different in-depth measures across the first and second images 702 and 704 is equal to, or greater than, the particular minimum height, the robotic system 100 can determine that the targeted object was successfully placed at the task location. The placement validation threshold can also correspond to an expected minimum height of a respective transferred object.

In some embodiments, the method further includes estimating a quantity of objects within the object stack at the start location and/or at the task location. The estimating includes determining, based on the image data (e.g., image data 502 in FIG. 5B), peripheral edges of the object stack (e.g., the object stack 500) and a height of the object stack (e.g., height $H_S$). The method includes deriving a volume of the object stack based on the peripheral edges and the height of the object stack. The method includes determining lateral dimensions for distinct regions within the object stack (e.g., distinct regions corresponding to the first column including objects 504 of the type A, the second column including objects 504 of the type B, and the third column including objects 504 if the type C). Surfaces of the distinct regions have a common height or a linear pattern in changes to the heights across one or more lateral directions. The method includes determining, based on the lateral dimensions for the distinct regions (e.g., the lateral horizontal surfaces illustrated with dashed lines in FIG. 5B) and corresponding estimated heights of peripheral vertical surfaces, a volume of respective distinct regions within the object stack. The method includes deriving, based on the derived volume of the object stack and the volumes corresponding to the respective distinct regions within the object stack, an estimation for the quantity of objects within the object stack.

In some embodiments, estimating the quantity of objects within the object stack further includes estimating a stacking pattern of the object stack. The estimating is done by comparing the determined peripheral edges of the object stack, a volume of the object stack, and the lateral dimensions for the distinct regions within the object stack with a set of predetermined templates and/or with a set of stacking rules (e.g., the master data of the robotic system 100 includes data regarding the predetermined templates and/or the set of stacking rules). The method includes deriving, based on the stacking pattern and the volume of the object stack, an estimation for the quantity of objects within the object stack. The objects within the object stack include objects of different dimensions (e.g., the objects 504 of types A, B, and C have different shapes and/or sizes).

In some embodiments, the method further includes comparing the estimation for the quantity of objects within the object stack to tracking history data (e.g., tracking history of the master data of the robotic system 100) identifying one or more objects that have been transferred from the start location to the task location to validate whether the tracking history data is accurate.

In some embodiments, the method further includes determining, in accordance with a determination that the second depth difference is less than the placement validation threshold, that the target object of the one or more objects was not successfully placed at the task location.

In some embodiments, the method includes deriving dimensions of the target object based on the image data and comparing the derived dimensions of the target object to tracking history data that identify previously transferred objects. When the derived dimensions are different from dimensions of the previously transferred objects, the method includes determining that the target object has been misidentified. in accordance with a determination that the derived dimensions of the target object do not correspond to the identified one or more objects that are expected to be transferred, that the target object has been misidentified.

In some embodiments, the method includes estimating, from the image data, peripheral edges of the target object that was validated to be successfully picked at the start location (e.g., FIGS. 6A and 6B illustrating removal of object 2 between respective stacks 606-1 and 606-2). The method includes identifying comparison locations, at the start location, adjacent to the peripheral edges of the target object. The comparison locations correspond to objects positioned adjacent to the target object (e.g., comparison locations {m, n} corresponding to object 3 in FIG. 6B). The method includes comparing estimated heights at the comparison locations before and after the target object has been picked from the start location to identify whether objects corresponding to the comparison locations have abnormalities.

In some embodiments, the method further includes determining that a difference between the estimated heights at the comparison locations before and after the target object has been picked corresponds to a height of an adjacent that was originally positioned adjacent to the target object. In accordance with such determination, the method includes determining that the adjacent object was picked unintentionally together with the target object.

In some embodiments, the method further includes determining a difference in the estimated heights at the comparison locations before and after the target object has been picked. In accordance with a determination that such difference is greater than a minimum height change requirement and/or the estimated heights at the comparison locations before and after the target object has been picked do not correspond to a planar surface, the method includes determining that an object adjacent to the target object has been damaged. A minimum height change requirement can correspond to a threshold value for classifying differences in heights across different images (e.g., different points in time) as having processing significance. In other words, the robotic system 100 can use the minimum height change requirement as a filter to block out measurement noise or other less significant changes in height. Accordingly, the minimum height change requirement may correspond to a value that is just above a typical measurement error (e.g., a standard deviation or an average deviation) for a difference in estimated heights of an object determined from two different images. For example, when the first difference is within the minimum height change requirement, the system can determine that the first difference corresponds to a measurement error. When the first difference is greater than the minimum height change requirement, the system can determine that the adjacent object has shifted from its position.

In some embodiments, the comparison locations include a first subset of comparison locations (e.g., comparison locations {p, q} in FIG. 6B) and a second subset of comparison locations (e.g., comparison locations {e, f}). The first and the second subset of the comparison locations are associated with a surface of an adjacent object located adjacent to the target object. The method further includes determining a first difference between estimated heights at the first subset of comparison locations before and after the target object has been picked and a second difference between estimated heights at the second subset of comparison locations before and after the target object has been picked. The method includes determining, in accordance with a determination that the first difference is within a minimum height change requirement and the second difference is greater than the minimum height change requirement, that the adjacent object has shifted (e.g., object 4 has shifted during the removal of object 1).

In accordance with some embodiments, a robotic system (e.g., the robotic system 100 in FIG. 1) includes at least one processor (e.g., the processor 202 in FIG. 2) and at least one memory (e.g., the storage device 204) including processor instructions. The processor instructions, when executed, cause the at least one processor to perform the methods described herein.

In accordance with some embodiments, a non-transitory computer-readable medium (e.g., the storage device 204) includes processor instructions that, when executed by one or more processors, cause the one or more processors to perform the methods described herein.

Conclusion

The above Detailed Description of examples of the disclosed technology is not intended to be exhaustive or to limit the disclosed technology to the precise form disclosed above. While specific examples of the disclosed technology are described above for illustrative purposes, various equivalent modifications are possible within the scope of the disclosed technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

These and other changes can be made to the disclosed technology in light of the above Detailed Description. While the Detailed Description describes certain examples of the disclosed technology as well as the best mode contemplated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the invention is not limited, except as by the appended claims. In general, the terms used in the following claims should not be construed to limit the disclosed technology to the specific examples disclosed in the specification, unless the above Detailed Description section explicitly defines such terms.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, either in this application or in a continuing application.

What is claimed is:

1. A method of operating a robotic system, the method comprising:

obtaining image data of a start location and/or a task location for transferring objects from an object stack at the start location to an object stack at the task location, wherein:

the image data include a sequence of images corresponding to transferring one or more objects from the start location to the task location, the sequence of images including a first image set depicting the start location and/or the task location before transferring the one or more objects and a second image set depicting the start location and/or the task location after transferring the one or more objects; and the image data include depth measures that represent estimated heights of surfaces at the start location and/or estimated heights of surfaces at the task location;

determining a depth difference between depth measures representative of the estimated heights of the surfaces in the first image set and the second image set;

validating, in accordance with a determination that the depth difference is greater than a threshold, that a target object of the one or more objects was transferred;

deriving dimensions of the target object based on the image data;

comparing the derived dimensions of the target object to tracking history data that identify previously transferred objects; and when the derived dimensions are different from dimensions of the previously transferred objects, determining that the target object has been misidentified.

2. The method of claim 1, further comprising estimating a quantity of objects within the object stack at the start location and/or at the task location by:

determining, based on the image data, peripheral edges of the object stack and a height of the object stack;

deriving a volume of the object stack based on the peripheral edges and the height of the object stack;

determining lateral dimensions for distinct regions within the object stack, wherein surfaces of the distinct regions have a common height or a linear pattern in changes to the heights across one or more lateral directions;

determining, based on the lateral dimensions for the distinct regions and corresponding estimated heights of peripheral vertical surfaces, a volume of respective distinct regions within the object stack; and deriving, based on the derived volume of the object stack and the volumes corresponding to the respective distinct regions within the object stack, an estimation for the quantity of objects within the object stack.

3. The method of claim 2, wherein estimating the quantity of objects within the object stack further includes:

estimating a stacking pattern by comparing the determined peripheral edges of the object stack, the volume of the object stack, and the lateral dimensions for the distinct regions within the object stack with a set of predetermined templates and/or with a set of stacking rules; and deriving, based on the stacking pattern and the volume of the object stack, an estimation for the quantity of objects within the object stack, wherein the objects within the object stack include objects of different dimensions.

4. The method of claim 3, further comprising comparing the estimation for the quantity of objects within the object stack to tracking history data identifying one or more objects that have been transferred from the start location to the task location to validate whether the tracking history data is accurate.

5. The method of claim 1, wherein:

the image data depicts the task location;

the depth difference corresponds to the depth measures representative of the estimated heights of the surfaces at the task location in the first image set and the second image set;

the threshold for the validation is a placement validation threshold;

validating includes validating that the target object of the one or more objects was placed at the task location;

the method further comprising:

determining, in accordance with a determination that the second depth difference is less than the placement validation threshold, that the target object of the one or more objects was not placed at the task location.

6. The method of claim 1, wherein:

the image data depicts the start location;

the depth difference corresponds to the depth measures representative of the estimated heights of the surfaces at the start location in the first image set and the second image set;

the threshold for the validation is a pick validation threshold;

validating includes validating that the target object of the one or more objects was transferred from the start location;

the method further comprising:

estimating peripheral edges, from the image data, of the target object that was validated to be transferred from the start location;

identifying comparison locations, at the start location, adjacent to the peripheral edges of the target object, the comparison locations corresponding to objects positioned adjacent to the target object; and comparing estimated heights at the comparison locations before and after the target object has been transferred from the start location to identify whether objects corresponding to the comparison locations have abnormalities.

7. The method of claim 6, further comprising:

determining, in accordance with a determination that a difference between the estimated heights at the comparison locations before and after the target object has been transferred corresponds to a height of an adjacent object originally positioned adjacent to the target object, that the adjacent object was transferred unintentionally together with the target object.

8. The method of claim 7, further comprising:

determining, in accordance with a determination that a difference between the estimated heights at the comparison locations before and after the target object has been transferred is greater than a minimum height change requirement and/or the estimated heights at the comparison locations before and after the target object has been transferred do not correspond to a planar surface, that an object adjacent to the target object has been damaged.

9. The method of claim 6, wherein the comparison locations include a first subset of comparison locations and a second subset of comparison locations, the first and the second subset of comparison locations associated with a surface of an adjacent object located adjacent to the target object, and the method further includes:

determining a first difference between estimated heights at the first subset of comparison locations before and after the target object has been transferred and a second difference between estimated heights at the second subset of comparison locations before and after the target object has been transferred; and determining, in accordance with a determination that the first difference is within a minimum height change requirement and the second difference is greater than the minimum height change requirement, that the adjacent object has shifted.

10. A robotic system comprising:

at least one processor;

at least one memory including processor instructions that, when executed, cause the at least one processor to perform a method comprising:

obtaining image data of a start location and/or a task location for transferring objects from an object stack at the start location to an object stack at the task location, wherein:

the image data include a sequence of images depicting transferring one or more objects from the start location to the task location, the sequence of images including a first image set depicting the start location and/or the task location before transferring the one or more objects and a second image set depicting the start location and/or the task location after transferring the one or more objects; and the image data include depth measures, determined from each image in the sequence of images, representative of estimated heights of surfaces at the start location and/or estimated heights of surfaces at the task location;

determining a depth difference between depth measures representative of the estimated heights of the surfaces in the first image set and the second image set;

validating, in accordance with a determination that the depth difference is greater than a threshold, that a target object of the one or more objects was transferred;

deriving dimensions of the target object based on the image data;

comparing the derived dimensions of the target object to tracking history data that identify previously transferred objects; and when the derived dimensions are different from dimensions of the previously transferred objects, determining that the target object has been misidentified.

11. The robotic system of claim 10, wherein the processor instructions cause performance of the method further including estimating a quantity of objects within the object stack at the start location and/or at the task location by:

determining, based on the image data, peripheral edges of the object stack and a height of the object stack;

deriving a volume of the object stack based on the peripheral edges and the height of the object stack;

determining lateral dimensions for distinct regions within the object stack, wherein surfaces of the distinct regions have a common height or a linear pattern in changes to the heights across one or more lateral directions;

determining, based on the lateral dimensions for the distinct regions and corresponding estimated heights of peripheral vertical surfaces, a volume of respective distinct regions within the object stack; and deriving, based on the derived volume of the object stack and the volumes corresponding to the respective distinct regions within the object stack, an estimation for the quantity of objects within the object stack.

12. The robotic system of claim 11, wherein estimating the quantity of objects within the object stack further includes:

estimating a stacking pattern by comparing the determined peripheral edges of the object stack, the volume of the object stack, and the lateral dimensions for the distinct regions within the object stack with a set of predetermined templates and/or with a set of stacking rules; and deriving, based on the stacking pattern and the volume of the object stack, an estimation for the quantity of objects within the object stack, wherein the objects within the object stack include objects of different dimensions.

13. The robotic system of claim 12, wherein the processor instructions cause performance of the method further including comparing the estimation for the quantity of objects within the object stack to tracking history data identifying one or more objects that have been transferred from the start location to the task location to validate whether the tracking history data is accurate.

14. The robotic system of claim 12, wherein the processor instructions cause performance of the method further including determining, in accordance with a determination that the second depth difference is less than the placement validation threshold, that the target object of the one or more objects was not placed at the task location.

15. A non-transitory computer readable medium including processor instructions that, when executed by one or more processors, cause the one or more processors to:

obtain image data of a start location and/or a task location for transferring objects from an object stack at the start location to an object stack at the task location, wherein:

the image data include a sequence of images depicting transferring one or more objects from the start location to the task location, the sequence of images including a first image set depicting the start location and/or the task location before transferring the one or more objects and a second image set depicting the start location and/or the task location after transferring the one or more objects; and the image data include depth measures, determined from each image in the sequence of images, representative of estimated heights of surfaces at the start location and/or estimated heights of surfaces at the task location;

determine a depth difference between depth measures representative of the estimated heights of the surfaces in the first image set and the second image set;

validate, in accordance with a determination that the first depth difference is greater than a threshold, that a target object of the one or more objects was transferred;

derive dimensions of the target object based on the image data;

compare the derived dimensions of the target object to tracking history data that identify previously transferred objects; and when the derived dimensions are different from dimensions of the previously transferred objects, determine that the target object has been misidentified.

16. The non-transitory computer readable medium of claim 15, wherein the instructions, when executed by one or more processors, cause the one or more processors to:

estimate a quantity of objects within the object stack at the start location and/or at the task location by:

determining, based on the image data, peripheral edges of the object stack and a height of the object stack;

deriving a volume of the object stack based on the peripheral edges and the height of the object stack;

determining lateral dimensions for distinct regions within the object stack, wherein surfaces of the distinct regions have a common height or a linear pattern in changes to the heights across one or more lateral directions;

determining, based on the lateral dimensions for the distinct regions and corresponding estimated heights of peripheral vertical surfaces, a volume of respective distinct regions within the object stack; and deriving, based on the derived volume of the object stack and the volumes corresponding to the respective distinct regions within the object stack, an estimation for the quantity of objects within the object stack.

17. The non-transitory computer readable medium of claim 16, wherein estimating the quantity of objects within the object stack further includes:

estimating a stacking pattern by comparing the determined peripheral edges of the object stack, the volume of the object stack, and the lateral dimensions for the distinct regions within the object stack with a set of predetermined templates and/or with a set of stacking rules; and deriving, based on the stacking pattern and the volume of the object stack, an estimation for the quantity of objects within the object stack, wherein the objects within the object stack include objects of different dimensions.

18. The non-transitory computer readable medium of claim 17, wherein the instructions, when executed by one or more processors, cause the one or more processors to:

compare the estimation for the quantity of objects within the object stack to tracking history data identifying one or more objects that have been transferred from the start location to the task location to validate whether the tracking history data is accurate.

19. The non-transitory computer readable medium of claim 17, wherein the instructions, when executed by one or more processors, cause the one or more processors to:

determine, in accordance with a determination that the second depth difference is less than the placement validation threshold, that the target object of the one or more objects was not placed at the task location.

* * * * *